(12) United States Patent
Hu et al.

(10) Patent No.: US 12,045,298 B1
(45) Date of Patent: Jul. 23, 2024

(54) TESTING FRAMEWORK TO MEASURE IMPACT OF VARIANT WITHIN LARGE SCALE RECOMMENDATION ENGINE

(71) Applicant: Morgan Stanley Services Group Inc., New York, NY (US)

(72) Inventors: Yixin Hu, Flushing, NY (US); Asit Sangode, Livingston, NJ (US); Qian Wang, Hoboken, NJ (US); Shubham Bagi, Jersey City, NJ (US); Abhishek Samdani, New York, NY (US); Basil Ariss, Jersey City, NJ (US); Supreet Kaur, Jersey City, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/532,181

(22) Filed: Dec. 7, 2023

(51) Int. Cl.
| | |
|---|---|
| *G06F 7/02* | (2006.01) |
| *G06F 16/00* | (2019.01) |
| *G06F 16/9535* | (2019.01) |
| *G06F 16/9538* | (2019.01) |
| *G06N 7/04* | (2006.01) |
| *G06N 20/00* | (2019.01) |
| *G06Q 30/0242* | (2023.01) |

(52) U.S. Cl.
CPC ...... *G06F 16/9535* (2019.01); *G06F 16/9538* (2019.01); *G06N 7/046* (2013.01); *G06N 20/00* (2019.01); *G06Q 30/0242* (2013.01)

(58) Field of Classification Search
CPC ............ G06F 16/9535; G06F 16/9538; G06Q 30/0242; G06N 20/00; G06N 7/00; G06N 7/046
See application file for complete search history.

(56) References Cited

U.S. PATENT DOCUMENTS

| | | |
|---|---|---|
| 10,614,481 B1 | 4/2020 | Haarstick et al. |
| 2008/0189156 A1 | 8/2008 | Voda et al. |
| 2011/0137721 A1 | 6/2011 | Bansal |
| 2013/0238539 A1 | 9/2013 | Liu et al. |
| 2015/0332308 A1 | 11/2015 | Liu |
| 2016/0055320 A1 | 2/2016 | Wang et al. |
| 2016/0188725 A1* | 6/2016 | Wang .................. G06F 16/9535 707/734 |
| 2016/0292248 A1 | 10/2016 | Garcia |
| 2018/0040032 A1 | 2/2018 | Chalasani et al. |
| 2023/0085466 A1* | 3/2023 | Kumar ................ G06F 16/5866 382/305 |

OTHER PUBLICATIONS

Goedle.io, "Measuring Marketing Success with Control Groups," medium.com, 2016, retrieved from https://medium.com/@goedle_io/measuring-marketing-success-with-control-groups-78d2f0ca6a91 Apr. 3, 2024 (Year: 2016).*

* cited by examiner

*Primary Examiner* — Bruce M Moser
(74) *Attorney, Agent, or Firm* — Leason Ellis LLP

(57) ABSTRACT

At least one processor is configured for defining a plurality of mutually exclusive customer treatment groups, including in accordance with first and second algorithms, to receive content items. Content items are respectively provided to a random customer treatment group as well as first and second algorithm customer treatment groups, and metrics representing at least engagement by each of the customers are determined and analyzed. A selection of the first or the second algorithm is made. The at least one processor is configured to provide, to at least some of the plurality of customers, content items in accordance with the selected algorithm.

20 Claims, 25 Drawing Sheets

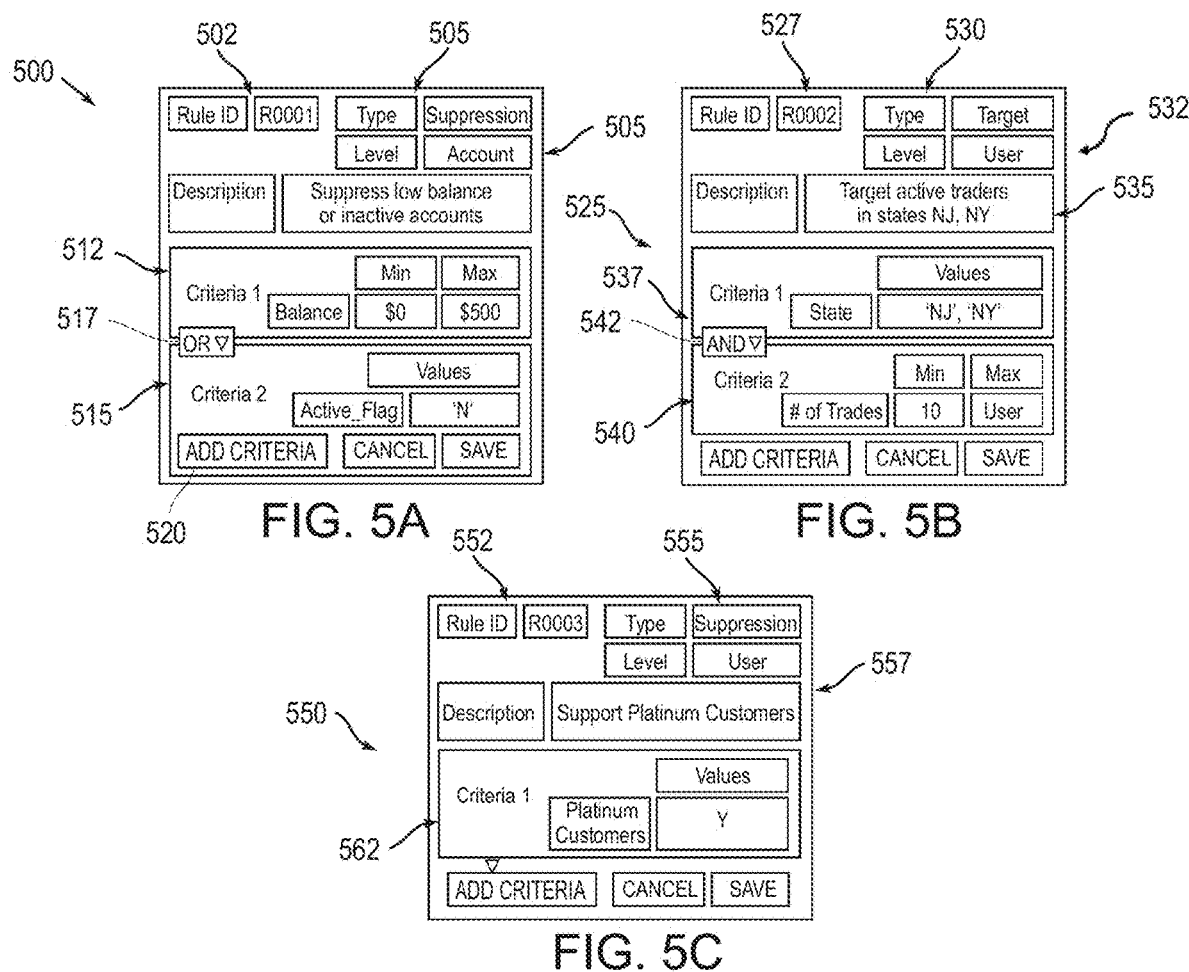

```
605    "RULE_ID": "R0001",
       "RULE_DESC": "Suppress inactive or low balance Accounts",
       "RULE_LOGIC": "Case when balance < 500 and upper(active_flag) in ('N','NO') then 1 else 0 end AS R0001_FLAG",
       "RULE_LEVEL": "Account",
       "RULE_CATEGORY": "Suppression"
       },
       {
610    "RULE_ID": "R0002",
       "RULE_DESC": "Target active traders in states NJ, NY",
       "RULE_LOGIC": "Case when no_of_trades >= 10 and state in ('NY','NJ') then 1 else 0 end as R0002_FLAG",
       "RULE_LEVEL": "User",
       "RULE_CATEGORY": "Target"
       },
       {
615    "RULE_ID": "R0003",
       "RULE_DESC": "Suppress Platinum customers",
       "RULE_LOGIC": "Case when platinum_customer in ('Y') then 1 else 0 end as R0003_FLAG",
       "RULE_LEVEL": "User",
       "RULE_CATEGORY": "Suppression"
       }
```

FIG. 6

TESTING FRAMEWORK TO MEASURE IMPACT OF VARIANT WITHIN LARGE SCALE RECOMMENDATION ENGINE

FIELD OF THE DISCLOSURE

The present disclosure relates to machine learning processes and organizational database systems, and in particular relates to an intelligent content personalization engine.

BACKGROUND OF THE DISCLOSURE

In many industries, to maintain competitiveness, it has become vital to be able to provide clients and customers (herein referred to as "end users") with offers and other content that are tailored as closely as possible to the known personal characteristics of the end users. However, for large organizations with a large customer base, providing such personalization at scale is not a trivial undertaking. Currently, some organizations have developed "personalization engines" which are configured to recommend relevant content for a customer base. Development of a personalization engine typically requires integrating large datasets, developing complex machine learning (ML) and/or deep learning (DL) as well as associated modules that address requirements such as testing and overrides.

Considering the different components at play, the architecture of personalization engines is complex, with the result that many personalization engines developed thus far have sub-optimal features. For example, many personalization engines are rigid in terms of functionality and operations, and have preconfigured limitations, such as predefined limits in the number of content inputs. In many cases, developing new features or content requires retooling and reconfiguration by engaging with technology teams and setting up projects. This process is time and cost intensive and requires the concerted efforts of technical personnel.

It would therefore be helpful to provide a personalization engine architecture which has built-in flexibility, avoiding rigid features and limitations, enabling non-technical personnel to define parameters and objectives without requiring the intervention of technical personnel.

SUMMARY OF THE DISCLOSURE

According to one or more implementations of the present disclosure, at least one processor is configured by executing instructions stored on non-transitory processor readable media, for accessing a customer database storing customer profile information respectively associated with each of a plurality of customers. The at least one processor is further configured to access a content repository storing content items to be provided to the plurality of customers. The at least one processor is further configured to access an algorithm database storing information associated with a plurality of algorithms, wherein each of the plurality of algorithms includes instructions for providing respective ones of the content items to respective subsets of the plurality of customers. The at least one processor is further configured for defining a plurality of mutually exclusive customer treatment groups comprising respective subsets of the plurality of customers. The customer treatment groups include a control customer treatment group that includes a subset of the plurality of customers excluded from receiving content items. Further, the customer treatment groups include a random customer treatment group that includes a subset of the plurality of customers selected to randomly receive content items. Moreover, the customer treatment groups include a first algorithm customer treatment group that includes a subset of the plurality of customers to receive content items in accordance with a first algorithm, as well as a second algorithm customer treatment group that includes a subset of the plurality of customers to receive content items in accordance with a second algorithm. At least the subset of the plurality of customers in the first algorithm customer treatment group and the subset of the plurality of customers in the second algorithm customer treatment group are selected for inclusion uniformly as a function of at least some of the customer profile information. The at least one processor is further configured for respectively providing content items to the random customer treatment group, the first algorithm customer treatment group, and the second algorithm customer treatment group. Thereafter, the at least one processor is configured to determine metrics representing at least engagement with the respectively provided content items by each of the customers in the control customer treatment group, the random customer treatment group, the first algorithm customer treatment group, and the second algorithm customer treatment group. The at least one processor selects, as a function of analyzing the metrics, at least one of the first algorithm and the second algorithm, wherein the step of selecting is made at least by: comparing the metrics associated with the random customer treatment group with the metrics associated with the control customer treatment group; comparing the metrics associated with the first algorithm customer treatment group with the metrics associated with the random customer treatment group; comparing the metrics associated with the second algorithm customer treatment group with the metrics associated with the first algorithm customer treatment group; and comparing the metrics associated with each of the random customer treatment group, the first algorithm customer treatment group, and the second algorithm customer treatment group with the metrics associated with the control customer treatment group. Thereafter, the at least one processor is configured to provide, to at least some of the plurality of customers, content items in accordance with the selected algorithm.

In one or more implementations, at least one of the customer treatment groups is further defined by: defining a size of a group of customers ("bucket"); providing a graphical user interface; receiving, via the graphical user interface, a lower bucket value representing a starting value and an upper bucket value representing an ending value; defining, as a function of the lower bucket value and the upper bucket value, a range of respective buckets; and allocating, as a function of the defined range, customers to the respective ones of the buckets for the at least one of the customer treatment groups.

In one or more implementations, the least one processor is configured to validate at least some of the buckets of customers to ensure at least one of a random distribution of customers, at least one similarity of customers within each bucket, and that each bucket includes a representation of a cross-section of the plurality of customers. The at least one processor is further configured to reassign respective customers to each of the buckets after determining the at least some of the buckets fail the step of validating.

In one or more implementations, the step of analyzing the metrics further includes applying at least one of machine learning and artificial intelligence to the metrics to evaluate, simultaneously, the impact of at least the first algorithm and the second algorithm on the respective customer treatment groups.

In one or more implementations, the at least one processor is configured to revise at least some of the respective content items by providing at least one of: new content; a new or different format of content; a new or different delivery channel; and a new or different frequency of delivery.

In one or more implementations, the at least one processor is configured to update, as a function of the machine learning and/or the artificial intelligence, at least some of the customer profile information for future delivery of content items.

In one or more implementations, at least some of the customer profile information represents at least one of previous engagement with content delivery items and customer demographics.

In one or more implementations, the first algorithm and the second algorithm have at least one common aspect. Further, the at least one processor is configured to define, for the content items, an algorithm innovation customer treatment group that includes a subset of the plurality of customers to receive content items in accordance with a third algorithm that does not have the common aspect.

In one or more implementations, delivery of at least some of the content items in accordance with the first algorithm and the content items in accordance with the second algorithm is based on at least one of: a respective version of the content items; respective sequences of content delivery; respective times of content delivery; and respective frequencies of content delivery.

In one or more implementations, the metrics represent at least one of: a rate of customer response; a duration of customer engagement; a degree of customer engagement; and a quality of customer engagement.

Other features of the present disclosure are shown and described herein.

BRIEF DESCRIPTION OF THE DRAWINGS

FIGS. 5A-5C illustrate exemplary rules publishing user interfaces according to the present disclosure through which users can edit or save rules details and their respective attributes.

FIG. 6 lists JavaScript Object Notation (JSON) translations of the corresponding example rules shown in FIG. 4.

DESCRIPTION OF CERTAIN EMBODIMENTS OF THE DISCLOSURE

Figure 1:
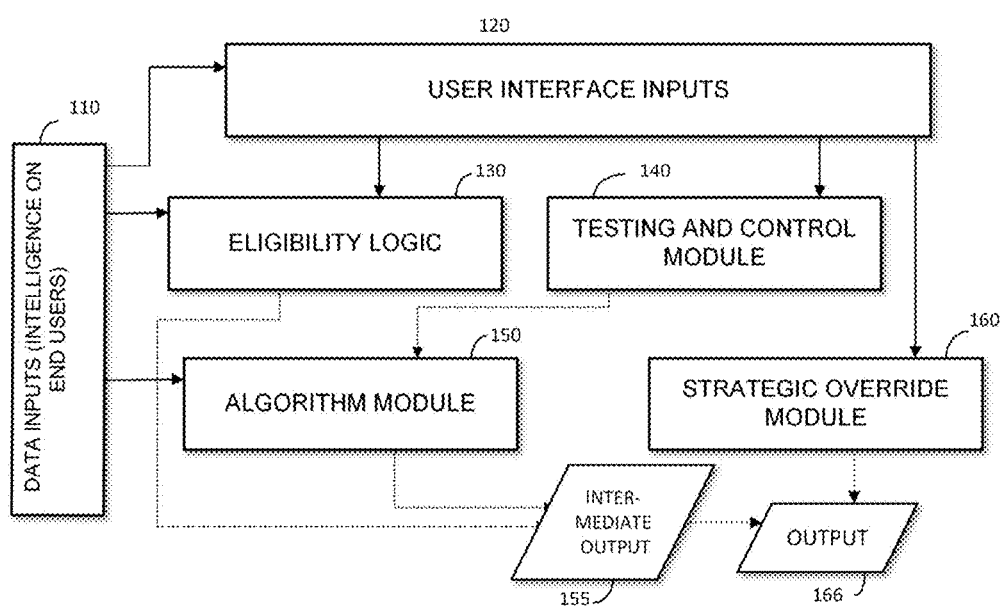
FIG. 1 is a schematic illustration of an embodiment of a personalization engine system according to the present disclosure.

The present disclosure provides a solution that aims to address the constraints noted above by employing a modular architecture for a personalization engine comprising multiple loosely-coupled modules, each delivering a unique functionality. In certain embodiments, the architecture includes three main module groups: eligibility assessment modules referred to as "eligibility logic," machine learning (ML)/deep learning (DL) modules referred to as "algo modules," and modules concerned with user-defined functionality referred to as testing and override modules. FIG. 1 is a schematic illustration of an embodiment of a personalization engine system according to the present disclosure. In FIG. 1, data inputs 110 are collected that include a vast array of feature information pertaining to end users. The feature information is referred to as curated feature data and is described in greater detail below with respect to FIGS. 2 and 3. User interfaces (UI) 120 include applications that are used to control processes such as eligibility rule configuration and selection, content creation and selection, testing and control, as well as strategic overrides. The user interfaces 120 access and operate on data stored in the data inputs 110. As described in greater detail below, the user interfaces 120 create (and/or modify) content items that are designed for delivery to end users. The users can define, through selection of specific parameters of the curated feature data, end users that are eligible or ineligible for receiving the created content. For instance, end users living in a certain state or residential area might be deemed ineligible for receiving certain content targeted toward other locations. The user interfaces 120 are also used to add content, design testing frameworks for content delivery, and for setting certain strategic override rules.

An eligibility logic module 130 is configured with the rules set up using the user interfaces 120 and applies the rules, in ways discussed below, to the curated feature data. In parallel, a testing and control module divides the end users into representative groups and then further divides the groups into corresponding segments of end users. These segments are delivered for testing of various treatments by an algorithm module 140.

The algorithm module 140 employs a variety of machine learning and/or deep learning (ML/DL) algorithms to determine content that is most appropriate to each end user. The ML/DL algorithms can be run in parallel and can include any suitable technique known in the art, including but not limited to artificial neural networks (e.g., deep learning networks, convolutional neural networks (CNNs), recurrent neural networks (RNNs), reinforcement learning networks (RLNs), support vector machines (SVMs), k-means and Naïve Bayes algorithms, as well as boosting algorithms such as AdaBoost. The ML/DL algorithms include supervised machine learning algorithms and can also include non-supervised ML algorithms. It is noted that when the term "machine learning" is used alone herein without "deep learning," that in such cases machine learning is meant to include deep learning.

Execution of multiple algorithms enables the testing of different modeling techniques. End user segments (e.g., various test segments or the control group) can be uniquely mapped to an algorithm to ensure that algorithms score mutually exclusive end user (e.g., customer) bases. Via the segmentation, each end user is only subject to scoring by one model. Business operators can configure which end user segment groups are subject to which model. This differentiation ensures one set of recommendations is prioritized for each end user. Each algorithm executed in the algorithm module 140 uses inputs from the data inputs 110 including the end user base, key features and attributes specific to the end users, and the content items defined by business users. The algorithm module 140 outputs a recommendation or ranking of content items for each end user based on, among other factors, product affinity, propensity to convert, value to the company, cost, etc. The output of the model scoring module is compiled independently of eligibility.

The respective outputs of the eligibility logic module 130 and the algorithm module 140 are combined into an eligible content ranking, which is an intermediate output 155. The intermediate output, constituting the eligible content ranking, can be modified by a strategic override module 160. The strategic override module 160 applies user-configured selection criteria to modify the content ranking, for instance, by adding or removing content entries or changing metadata, converting the intermediate output into a final output 165. The final output 165 constitutes a ranking of content, prioritizing the content items to be sent to targeted end users.

Figure 2:
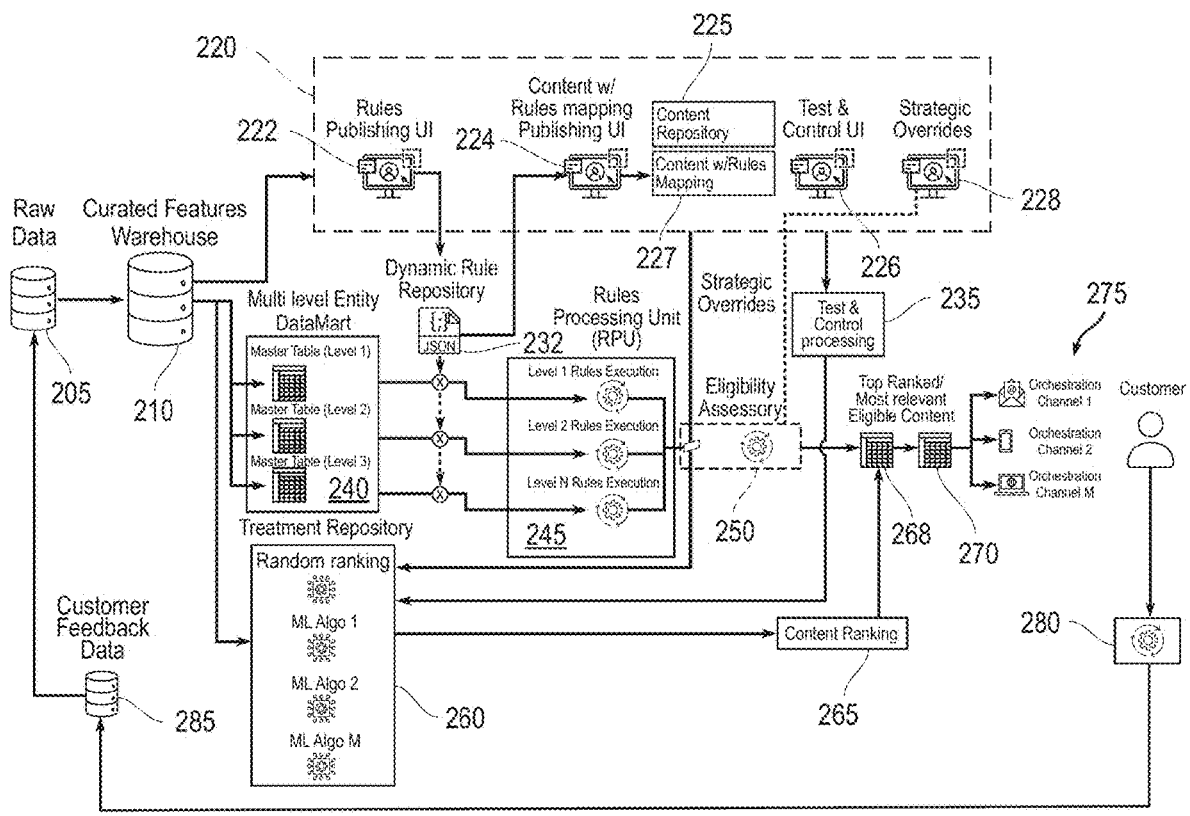
FIG. 2 is a schematic illustration of a more detailed embodiment of the personalization engine system according to the present disclosure.
Figure 3:
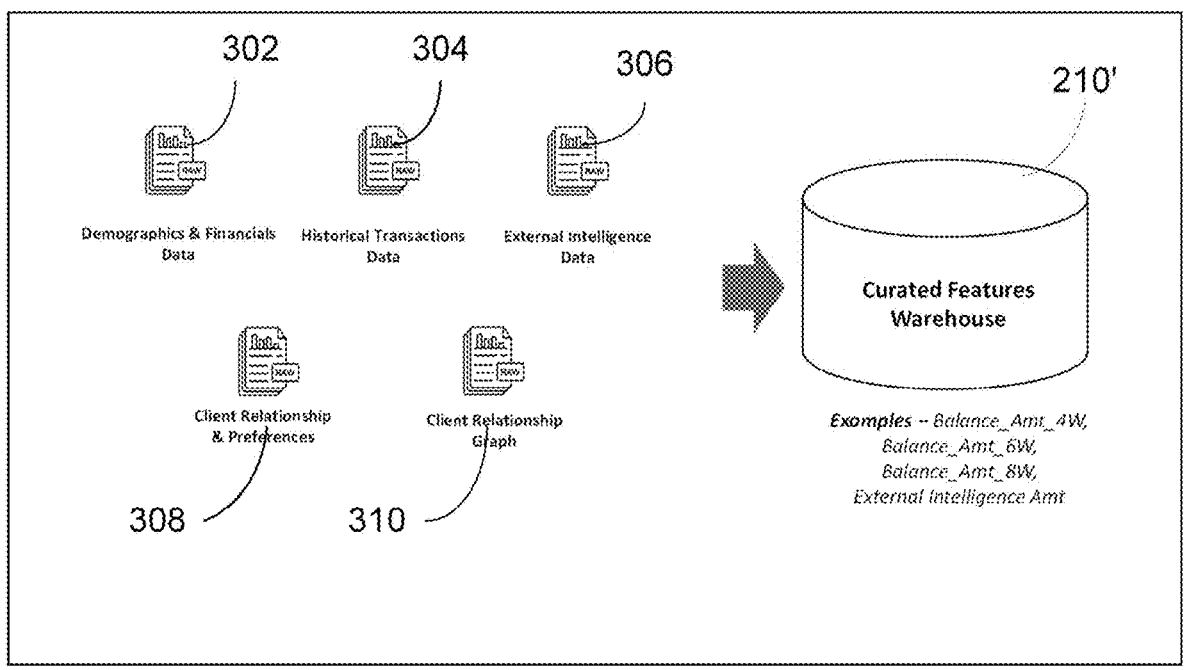
FIG. 3 is a schematic illustration of an exemplary implementation of raw data from which a curated database is generated.

FIG. 2 is a schematic view of a more detailed embodiment of the personalization engine system according to the present disclosure. The system ingests raw data 205 which is assembled from a variety of different sources. A large set of features is then extracted the raw data 205 to create a curated feature database 210. FIG. 3 is a schematic illustration of an exemplary implementation of raw data from which a curated database 210' is generated. The raw data in this example includes demographic and financial data 302, historical transaction data 304, external intelligence data 306, client relationship and preference information 308, and client relationship graphs 310. From this raw data 302-310, features are extracted using scripts to generate the curated feature store 210'. The curated feature database 210', which, to date, includes approximately 3000 distinct features (but is not limited that number of features), is used to train and score machine learning models, to support the publication of new business rules and to drive eligibility assessment. Example features can include account balances of customers taken at different time captures (e.g., 4-week, 8-week, and so on), household information, known retirement fund balances, etc.

Figure 4:
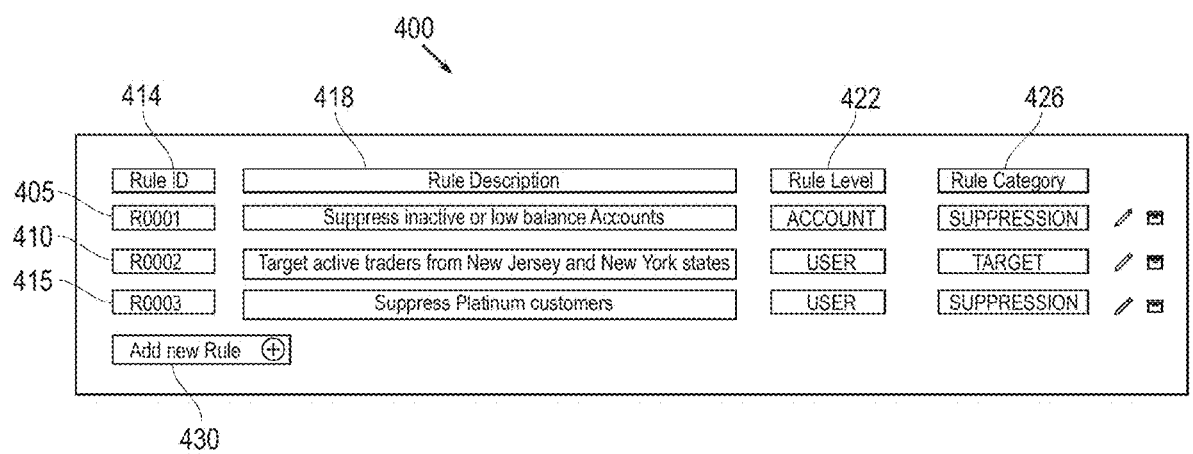
FIG. 4 illustrates an exemplary rules publishing user interface home screen according to the present disclosure which users can user to list and initiate new eligibility rules.

Referring again to FIG. 2, the curated feature database 210 is accessible by several user interface (UI) applications 220. Among the UI applications 220 is a rule publishing UI 222 that enables users to create eligibility rules by selecting attributes and values. FIG. 4 is an exemplary eligibility rules repository home page 400. FIG. 4 lists the rules that have already been created and stored in a rule repository in a tabular format. For ease of illustration, in FIG. 4 only three rules 405, 410, 415 are shown. Each rule 405, 410, 415 occupies a row of the table, and each column stores an attribute of the rules. The listed attributes include a Rule ID 414, which is an alphanumeric identification that can be set automatically by increments, a Rule Description 418 that provides a short description of the what the rule does, a Rule Level 422 which sets the applicable customer level to which the rule applies, and a Rule Type 426 which indicates the behavior of the rule in terms of denying or promoting eligibility. An "Add New Rule" button 430 at the bottom of UI 400 allows a user to activate a rule creation UI, examples of which are shown in FIGS. 5A-5C. The UI also includes edit rule and delete rule functionality (distinct buttons for these are not shown for ease of illustration).

In the examples rules shown in FIG. 4, rule 405 has a Rule ID of "R0001," a Rule Description of "Suppress Inactive or Low Balance Accounts," a Rule Level of "Account" and a rule type of "Suppression, indicating that the rule is used to deny eligibility to Accounts based on further criteria (e.g., a balance amount). Rule 410 has Rule ID "R0002" a Rule description "Target active traders from New Jersey and New York states," a Rule Level of "User" and a Rule Type of "Target" indicating those Users who meet the further criteria of this rule will be targeted. Likewise, rule 415 has Rule ID "R0003," a Rule Description of "Suppress Platinum Customers," a Rule Level of "User" and a Rule Type of "Suppress."

FIGS. 5A-5C are exemplary rules publishing user interfaces which users can create and edit eligibility rules, particularly the rules listed in the home page of FIG. 4. Referring to FIG. 5A, the UI includes a rule ID field 502 in which an identification number for the rule can be automatically generated or manually input. In the example shown, the rule is given an ID of R0001. A rule type field 505 sets the effect that the rule has on content delivery. Some rules are used to suppress the distribution of content to end-users and deny eligibility of the content, and other rules can be used to specifically target certain end-users. In the example shown, the rule type selected is "Suppression." A rule level field 507 sets the applicable level to which the rule applies; levels include individual customer (user), household, account, etc. In the example shown in FIG. 5A, the rule level is set for "Account." A description field 510 is used to describe the purpose and effect of the eligibility rule, in this case "suppress low balance of inactive accounts." Importantly, the rules eligibility UI 500 can be used to add and configure the criteria that activate the rule. In the example of FIG. 5A, there are two criteria 512, 515. The first criterion 512 is based on an account balance and activates when the balance is between a set minimum of zero dollars and a set maximum of 500 dollars. The second criterion 515 is an activity flag which is set at "N." A logical relationship setting 517 sets the logical relationship between the two criteria 512, 515. In the example shown, the logical relationship setting is "OR" which indicates that if either criteria is met, the eligibility rule will be applied. Additional criteria can be set using an "Add Criteria" button 520 shown at the bottom of the UI.

FIG. 5B shows another example eligibility rule publishing UI 525. The rule ID field 527 includes rule ID of "R0002" and the rule type 530 and rule level 532 fields indicate that Rule R0002 is a targeting rule for level "User." The description field 535 shows that the rule is intended to "target active traders in NJ, NY." Rule R0002 also includes two criteria 537, 540. The first criterion 537 sets the states in which the rule applies, in this case New Jersey (NJ) and New York (NY). The second criterion 540 sets a minimum number of trades for the user, in this case set at ten. No maximum is set. That is, the rule only applies to users that have executed at least ten trades. The logical relationship 542 for the criteria 537, 540 is in this case set at "AND," indicating that both criteria 537, 540 must be met for the eligibility rule to apply. Similarly, FIG. 5C shows a further example eligibility rule publishing UI 550. In UI 550, the corresponding rule ID field 552 includes ID "R0003," rule type file 555 is set at "Suppression" and rule level field 557 is set at "User." The description field 560 is set at "Suppress Platinum Customers." There is only a single criterion 562 for this rule, which includes information "Platinum Customer" and "Y," indicating that the suppression rule is activated for all Platinum Customers (e.g., for users having data records in which a platinum customer field is checked/filled with a "Y").

In summary, through the rules publishing user interface, a user can create a rule with a combination of multiple criteria that cover different attributes using selected AND/OR logical conditions. The values for the attributes can be in the form of a range (min value, max value) or list of values. Information entered into the rule publication UIs 500, 525, 550 is translated into SQL logic scripts in the backend. The SQL logic scripts are stored in a dynamic rule repository 232 (in FIG. 2) in JavaScript Object Nation (JSON) format, and they appear to the user. The storage of the SQL logic in JSON format allows eligibility determinations to be executed more easily. FIG. 6 shows JSON translations 605, 610 of the corresponding example rules 405, 410 discussed above with respect to FIG. 4 (and entered in the UIs of FIGS. 5A and 5B). The JSON translations essentially convert the selections from the UI into logical conditional statements 605, 610. When the scripts are executed, and the logical conditions are met, the relevant rules are thereby triggered.

Figure 7:
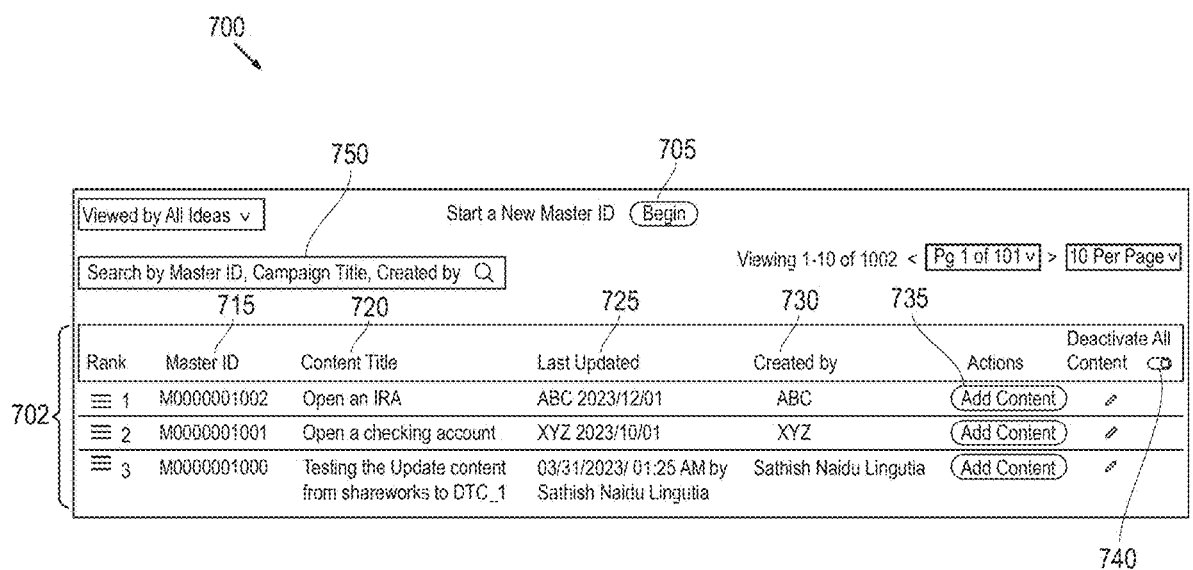
FIG. 7 is an exemplary illustration of a content repository user interface according to the present disclosure that contains a listing of content items related to saved distribution campaigns.

Returning to FIG. 2, UI applications 220 also includes a content publishing UI 224 through which users can add and update items of content. Each content item has a taxonomy that is populated to enable scoring by the ML algorithms. Metadata and IDs are incrementally generated through predefined logic. The content publishing UI 224 outputs a list of content items that is stored in a campaign content repository 225. FIG. 7 is an exemplary illustration of a content repository user interface (UI) 700 that contains a listing of content items related to saved distribution campaigns. The top of UI 700 includes an activation button 705 that enables the user to add a new content item with a new master ID. Below activation button is a listing 710 of content items, in which each content item occupies a row of the listing. For ease of illustration only three content items are shown. The columns of the listing include attributes of the content items. Each content item is identified with a Master ID 715. Other attributes include a content title 720, a time at which the content item was last updated 725, and the name of the user who created the content 730. Each row also includes an activation button for adding content 735. The content repository UI 700 also includes an option to deactivate all content 740 and a search bar 750 that allows users to search for content by Master ID or other attributes.

Figure 8A:
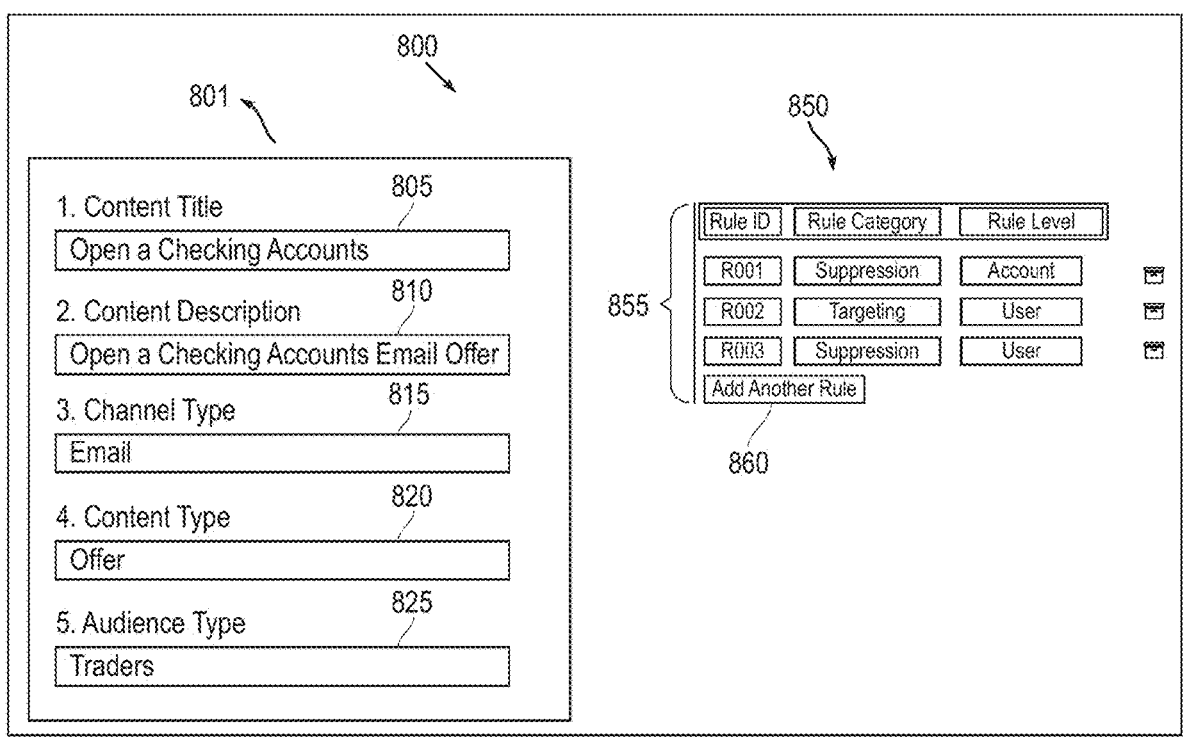
FIG. 8A is an exemplary user interface for adding or editing content with rules mapping according to the present disclosure.

FIG. 8A is an exemplary user interface for adding or editing content with rules mapping according to the present disclosure. The left part of the UI 800 includes a content entry UI 801 that contains input boxes (or in some cases drop-down menus) into which users can enter information regarding corresponding attribute of a new content item. There are input boxes for several content attributes including content title 805, content description 810, channel type 815, which describes the mechanism through which the content item is to be delivered to the end user, content type 820 (e.g., offer, discount), and an audience type 825. The right side of the UI includes a rules association section 850 for associating eligibility rules with the content item in UI 801. The rules association section 850 includes a listing of eligibility rules 855 that have been associated with the content, meaning that before the content is delivered, eligibility rules are applied to modify the end users who may be excluded (suppression) from or specifically included (targeted) in a content delivery campaign. The rules association section includes an activation button 860 through which the user can associate further eligibility rules with the content.

Figure 8B:
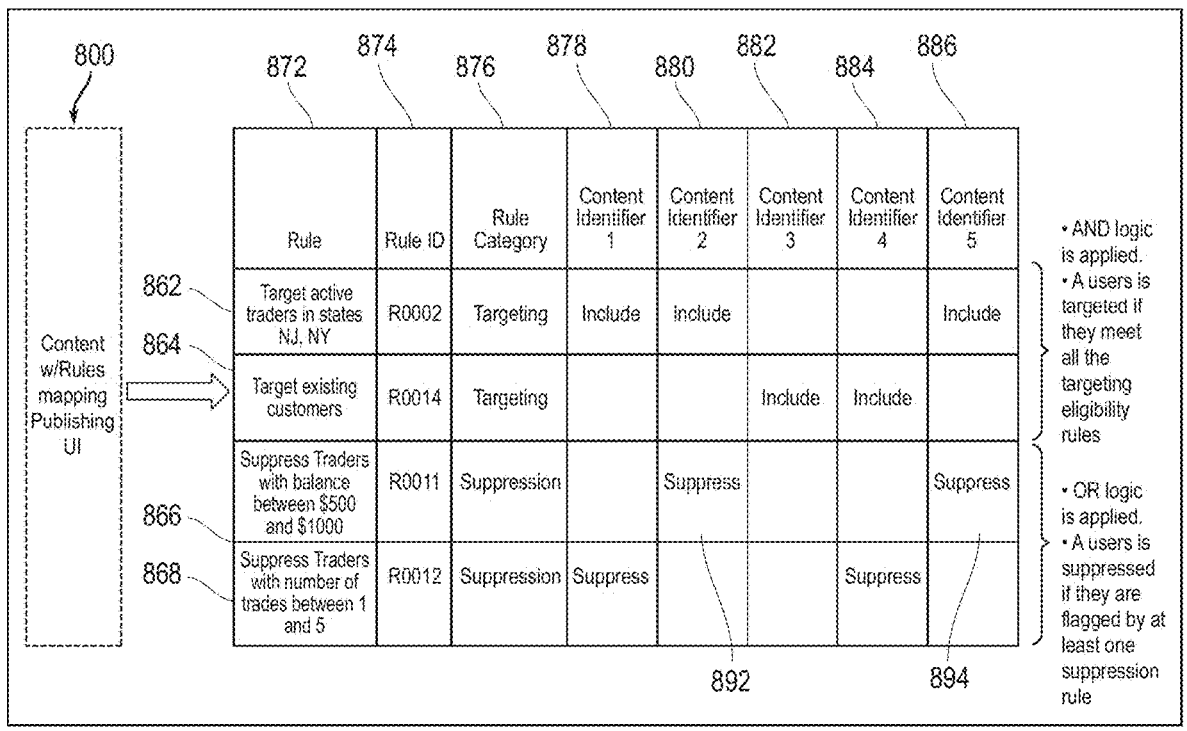
FIG. 8B is a table that shows how rules are stored in association with content items according to an implementation of the present disclosure.

FIG. 8B is a table that shows how rules are stored in association with content items according to an implementation of the present disclosure. Each row of the table, 862, 864, 866, 868 is associated with an eligibility rule. Each column of the table is an attribute of the eligibility rule. The first column provides a rule description 872, the second column includes the ID of the rule 874, and the third column includes the rule type, such as targeting or suppression. The remaining columns 878, 880, 882, 884, and 886 include content identifiers 1-5. The eligibility rule of the third row 866 is used as an example to describe how the content identifiers function in the table. The third row, which includes data corresponding to Rule ID 0011, corresponds to the eligibility "Suppress Traders with balance between $500 and $1000." The rule is of type "suppression." As can be seen by scanning the content identifiers 878-886, in row 866, only the cells corresponding content identifiers 2 and 5 (892, 894 in FIG. 8B) include data, in this case "suppression"; the other content identifier cells in this row are left blank. This means that the eligibility rule only suppresses content having identifiers 2 and 5 and has no effect on content identifiers 1, 3, and 4. The same holders, mutatis mutandis, with respect to the other rules shown in FIG. 8B.

Referring now to the left side of FIG. 2, the curated features warehouse 210 feeds data to a multi-level entity "data mart" 240 (hereinafter "N-Level data mart" for brevity). The N-Level data mart 240 divides the incoming data according to entity level into separate repositories (e.g., master tables). For example, when there are three entity levels, user, account, and household, there are separate repositories for each of the three entity levels. It is noted that the N-level data mart 240 is scalable to include repositories for additional entities as necessary.

In terms of the flow of information within the personalization system of FIG. 2, a rules processing unit 245 receives input from the N-level data mart 240 as well as from the dynamic rules repository 232 governing eligibility. Using these inputs, the rules processing unit 245 executes N-levels of rules according to the N levels of entities. The program code (e.g., SQL) of each rule interacts with only one of the repositories in the N-level data mart depending on entity level. The rules processing unit 245 is configured to ensure efficient, non-redundant execution of the rules such that every rule is executed only once irrespective of the level of the repository (e.g., master table). This allows the rules processing unit to have a multi-fold scalable design in that it can scale in both the number of rules applied and the number of levels in the data mart as well as the amount of data in each level. The output of the rules processing unit 245 is fed to an eligibility assessor 250. The eligibility assessor 250 draws input from the content with rules mapping 227 and is configured to determine eligibility at the lowest level (e.g., the account level) to produce a single eligibility recommendation for each account and each item of content. The scalable and efficient design of the eligibility assessor 250 eases the process of applying business rules across the entire population to add k-content items and ensures optimization of run time.

Figure 9:
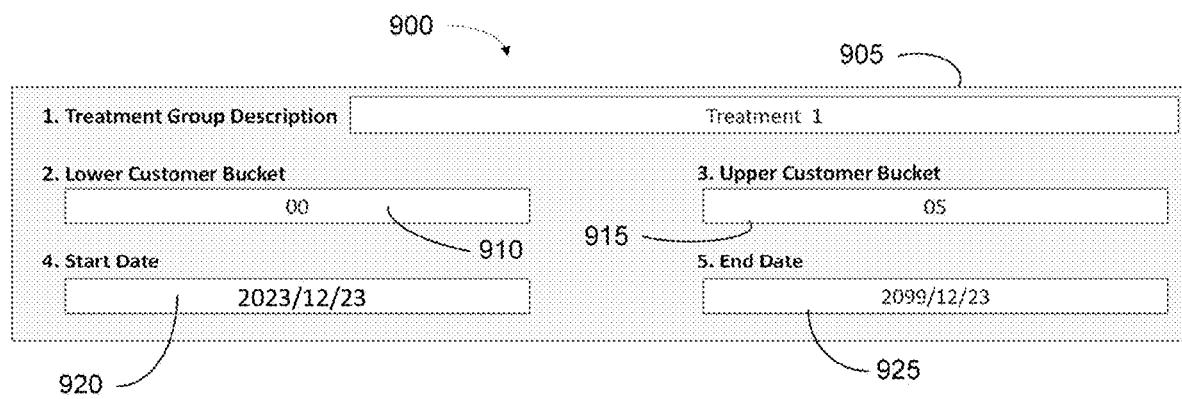
FIG. 9 is an exemplary user interface for configuring testing and control of treatments according to an embodiment of the present disclosure.

Once content has been set and associated with eligibility rules and campaigns, a testing and control UI 226 can be used to arrange algorithmic testing of the various content items. FIG. 9 is an exemplary user interface for configuring testing and control of treatments (e.g., different types of tests of content on user groups) according to an embodiment of the present disclosure. The testing and control UI 900 includes an input box for a treatment group description 905, which in the illustrated example is "Treatment 1." It also includes fields for a lower customer bucket 910 and an upper customer bucket 915. As described in greater detail below, the customer buckets are groupings of a defined number of customers. Procedures are used to ensure that each of the buckets are representative of the customers as a whole and that they are therefore useful subsets of the total customer based for performing tests. The lower and upper customer buckets 910, 915 define the range of customers within each of the buckets that are to be used for Treatment 1. In this example, 6% of the customer base will receive "Treatment 1" (bucket 00 to 05). The test and control UI 900 also defines a start time and an end time for which Treatment 1 is applicable.

With respect to the aims of a personalization engine, which is to target optimal content to end-users, it is useful for organizations to compare various strategies (e.g., recommendations or decision engine outputs) to identify those most optimal for driving end-user engagement. To measure the benefit of each strategy, a robust approach is needed in which the end-user base is unbiasedly segmented. For proper testing, it is important for each segment to be representative. Treatment groups are derived from the segmented end-user base. Testing entails assigning a strategy or treatment (referred to going forward as a treatment for brevity) to the treatment groups and measuring the impact of each treatment comparatively.

Figure 10:
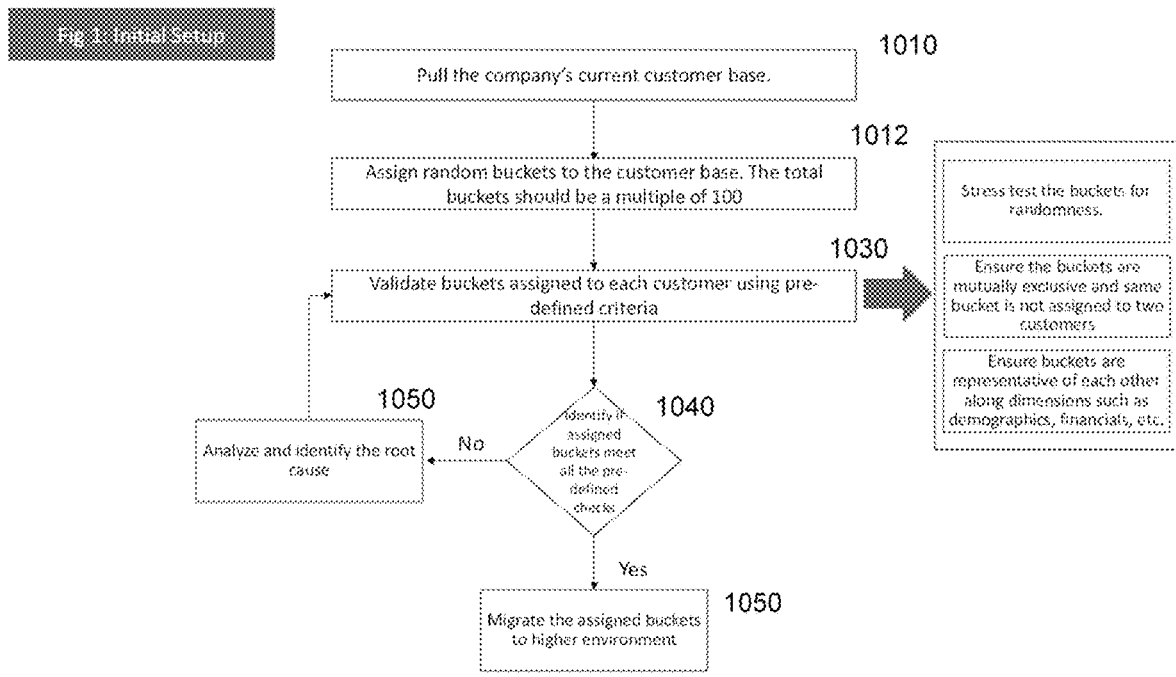
FIG. 10 is a flow chart of a method of setting up population bucketing according to an embodiment of the present disclosure.

FIG. 10 is a flow chart of a method of setting up population bucketing according to an embodiment of the present disclosure. In an initial step 1010, the end user (e.g., customer) base is accessed. The end user base can include one or more lists or tables stored in one or more databases. In a following step 1020, each end user is assigned to a specific bucket (a bucket is a term for an end user grouping). The number of buckets is set at a multiple of 100. In some implementations, each bucket contains a multiple of 100 individuals, but this is not necessarily the case. The assignment of the end user to a bucket is designed to occur only once throughout their engagement lifecycle with the organization. The assignment process is based on a random sorting process. Those of skill in the art will appreciate that there are many ways in which such random assignment can be implemented.

TABLE I shows an example of assignments of end users to particular buckets together with the date upon which the assignment was made. In some implementations, additional information can be included in the Table or otherwise associated with the assignment.

TABLE I

| END USER ID | TREATMENT TYPE | BUCKET NO. | INSERT DATE |
| --- | --- | --- | --- |
| 12345678 | A | 01 | Dec. 31, 2023 |
| 91024357 | B | 05 | Dec. 31, 2023 |
| 30245679 | C | 30 | Dec. 31, 2023 |

After end users have been assigned to buckets, the buckets are validated in step 1030. The validation step can involve a number of sub-steps. In some implementations, the validation step includes testing whether the buckets have a sufficiently random distribution of end user characteristics, ensuring that the buckets are mutually exclusive and that no customer is assigned to more than one bucket, and determining that the buckets are similar and representative along dimensions such as demographics, financial characteristics, etc. In step 1040, it is determined whether or not the buckets meet the conditions for validity. If it is determined in step 1040 that the buckets do not meet the conditions for validity, in step 1060 the buckets are analyzed, and bucket reassignments are made; this process then cycles back to step 1030. If it is determined in step 340 that the buckets meet the conditions for validity, the process flows to step 1050 in which the buckets are output for further use, ending the process.

Figure 11:
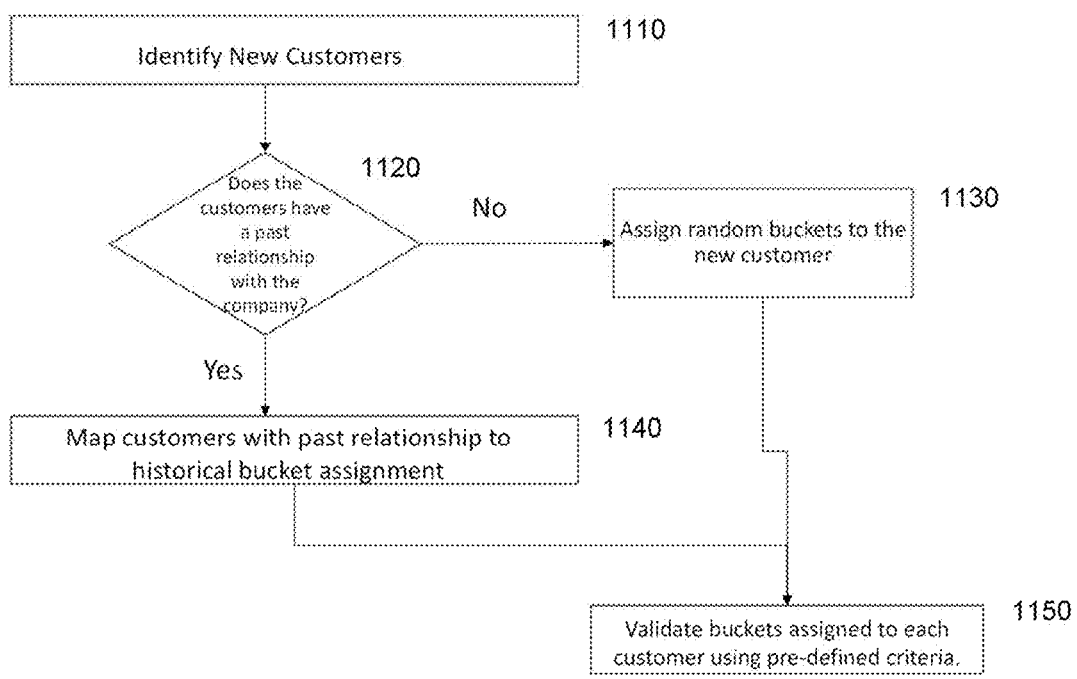
FIG. 11 is a flow chart for handling updates to the end user base according to an embodiment of the present disclosure.

FIG. 11 is a flow chart for handling updates to the end user base. In a first step 1110, a new end user is identified. In a following step 1120, it is determined whether the new end user has a past relationship with the pertinent organization. If the end user does not have a past relationship with the organization, then in step 1130, the new end user receives a new bucket assignment. If the end user does have a past relationship with the organization, in step 1140, the end user is mapped to a past bucket assignment. In either case, the method proceeds to step 1150, in which the bucket, with the newly assigned or mapped end user, is validated. According to this method, once an end user is assigned a bucket, this assignment remains fixed.

Once bucket assignments and updating are completed, the buckets are grouped to form segments. The segmentation proceeds such that the total sum across the segments covers the entire (100 percent) of the end user base. In some implementations, a configuration file is created which maintains the mapping between the end user bucket ranges and end user segments. Updating of bucket ranges changes how customers are mapped to segments and is reflected in the configuration file. The configuration file can also specify the treatment performed on the various segments. Keeping such information in a configuration file is a convenient way to update the assignment of end users to segments and treatment groups. The validated randomness of the bucket assignment process ensures that each created customer segment is representative of the overall population and that there is no bias in the population. The grouping of buckets also ensures that the end user segment groups do not overlap and are mutually exclusive.

Figure 12:
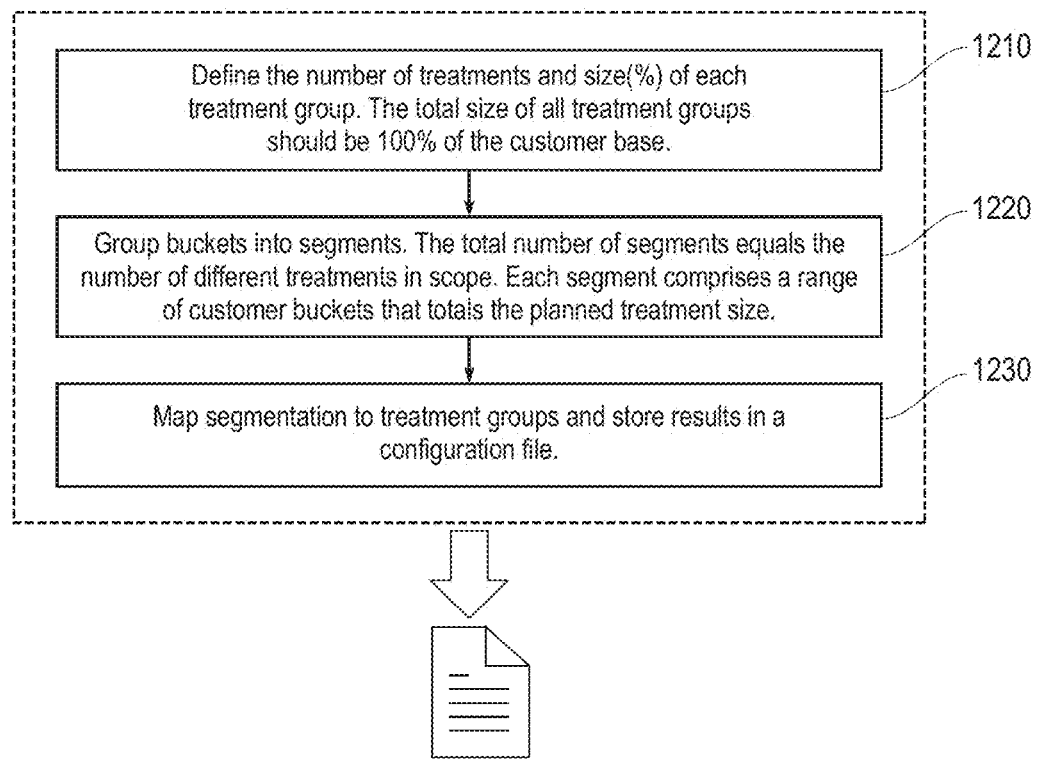
FIG. 12 is a schematic flow chart of an embodiment of a method for implementing a configuration file that can be used to store the mapping between end user bucket ranges and end user segments according to the present disclosure.

FIG. 12 is a schematic flow chart of an embodiment of a method for implementing a configuration file that can be used to store the mapping between end user bucket ranges and end user segments according to the present disclosure. In a first step 1210, a business user defines a plurality of treatments and the size, in terms of numbers of individuals tested, in each treatment group. It is intended that the total size of all treatment groups should cover 100 percent of the customer base. In step 1220, the buckets are grouped into segments. The total number of segments is equal to the number of different treatments in scope. Each segment comprises a range within the end user buckets that comprises the planned treatment size. In a following step 1230, the segmentation is mapped to the treatment groups and stored in the configuration file. The format of the configuration file can be any suitable format as known to those of skill in the art, and in some cases is a platform-neutral format such as JSON, XML, or YAML.

Figure 13:
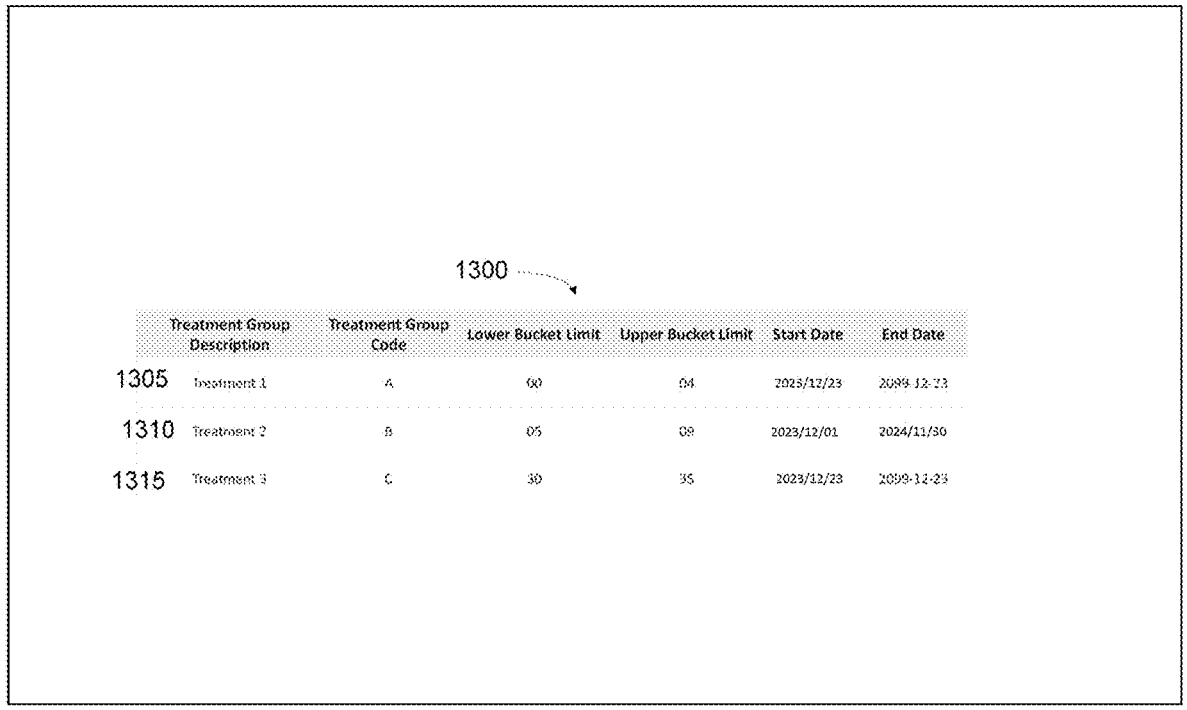
FIG. 13 is a tabular representation of a configuration file for a treatment mapping according to an embodiment of the present disclosure.

FIG. 13 is a tabular representation of a configuration file 1300 as discussed above. Each row of the of configuration file 1300 is allocated to a particular treatment. Each treatment is a specific approach to sending communications (e.g., offers, rewards, information) to end users, with the aim of eliciting a positive response. In the example shown there are three rows 1305, 310, 1315 corresponding to Treatment 1, Treatment 2, and Treatment 3. Each treatment is associated with a treatment code, a lower bucket limit and upper bucket limit, a start date and an end date. As an example, Treatment 2 has a lower bucket limit of 05 and an upper bucket limit of 09. As the buckets have been validated as being representative, this method of sampling ensures a representative allocation of individuals to the various Treatments (although buckets can contain a much larger number of individuals). The start dates and end dates indicate that the Treatment might is applicable only during the period between the start and end dates.

Figure 14:
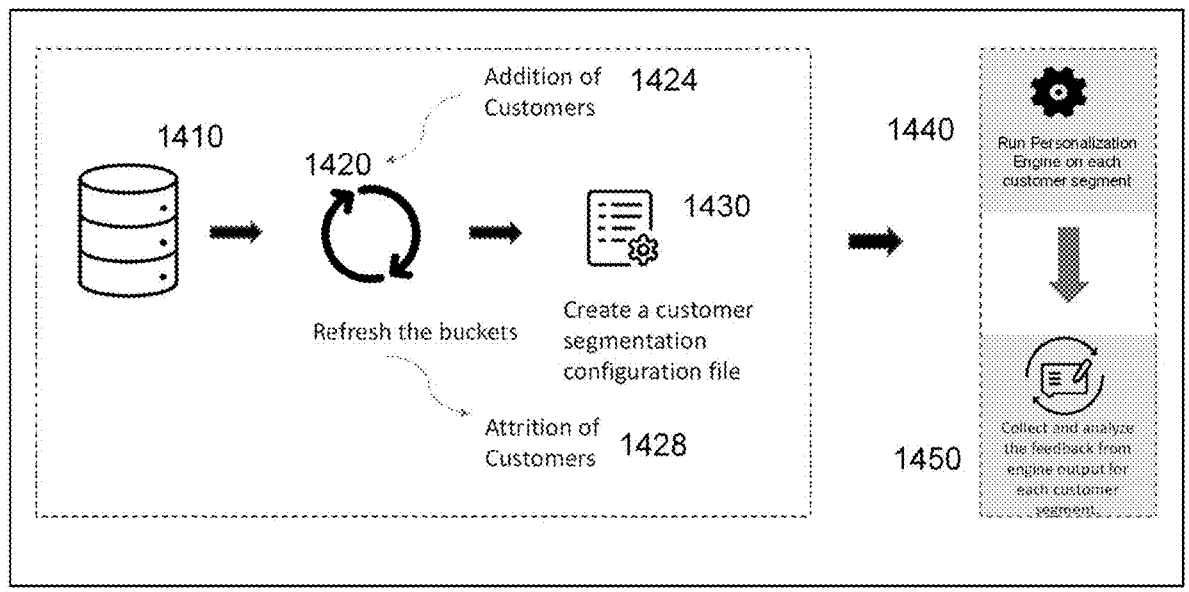
FIG. 14 is a schematic illustration of a method of determining the efficacy of multiple machine learning strategies simultaneously through running the personalization engine on multiple end user segments according to an embodiment of the present disclosure.

FIG. 14 is a schematic illustration of a method of determining the efficacy of multiple machine learning strategies simultaneously through running the personalization engine on multiple end user segments according to an embodiment of the present disclosure. In step 1410, the end user buckets are initialized, and the end user base is assigned to the initialized buckets. In step 1420, the buckets are updated (refreshed) with a certain number of end users being added 1424, and a certain number of end users being removed 1428. In step 1430, the end user segmentation configuration file according to treatment is generated. As described below, the treatments are delivered to machine learning algorithm modules for the execution of multiple treatments on the various end user segments in step 1440, with segment 1 allocated to Treatment 1, segment 2 allocated to Treatment 2 and so on. In step 1450, responses output by the end users in the various segments responding to the corresponding strategies are collected. The collected information is fed back into the machine learning algorithms of the algo module and is used to revise and optimize the next generation of treatments.

In one or more implementations of the present disclosure, an innovative testing framework is provided that measures and tests the effectiveness of the personalization engine, including operations thereof and recommendations made thereby. The testing framework of the present disclosure addresses the complexity and many features of the personalization engine, including large volumes of data and multitudes of data sources. The testing framework of the present disclosure includes features for separating and measuring the impact of each of a plurality of campaign innovations and variants, which can operate simultaneously, including by isolating and measuring the effectiveness of each of a plurality of respective components, including algorithms operating to provide particular campaigns. Identifying the effectiveness of such components enables the testing framework to improve testing strategies, which improves operations of the personalization engine.

In one or more implementations of the present disclosure, a customer management engine is provided, which includes technology for assigning new and existing customers to respective treatment groups. More particularly, customers can be partitioned into buckets, such as shown and described herein at least with reference to FIG. 10. The testing framework of the present disclosure can implement technology to configure one or more computing devices with instructions to group buckets of customers into respective segments, at least in part as a function of entries received in response to prompts provided in a test and control graphical user interface (FIG. 9).

Figure 18:
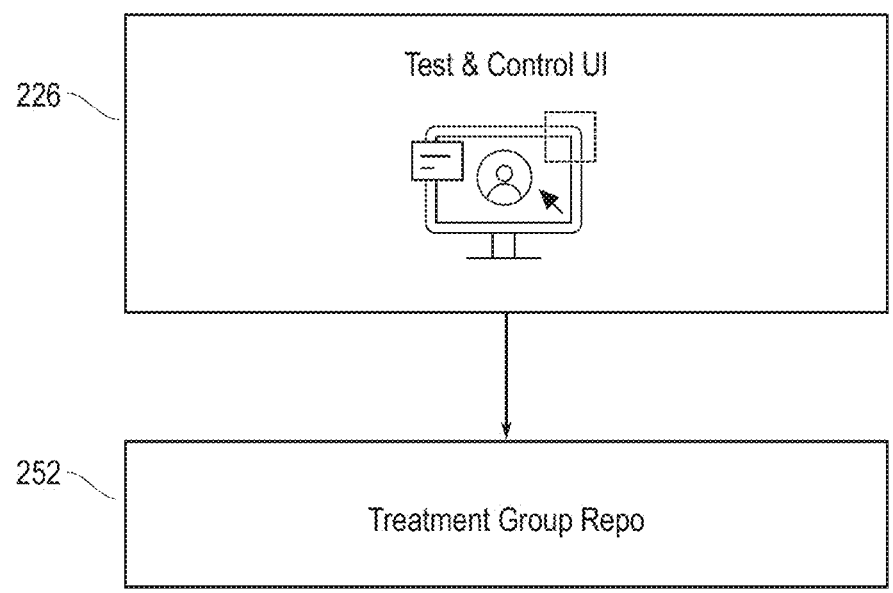
FIG. 18 is a simple block diagram illustrating a test and control user interface and corresponding treatment group(s) generated as a function of the test and control user interface, in accordance with an example implementation of the present disclosure.

As noted herein, the present disclosure provides a technological solution for providing a new testing framework that supports handling of highly complex data from large numbers of sources. With reference to FIG. 18, testing and control UI 226 (FIG. 2) is usable to implement algorithmic testing of various content items, including once such content has been set and associated with eligibility rules of respective campaigns and/or all campaigns, more generally. Information received in testing and control UI 226 can be used for test and control processing 235, as well as for defining one or more repositories of treatment groups 252 and configuring testing and control of treatments therefor.

Figure 19:
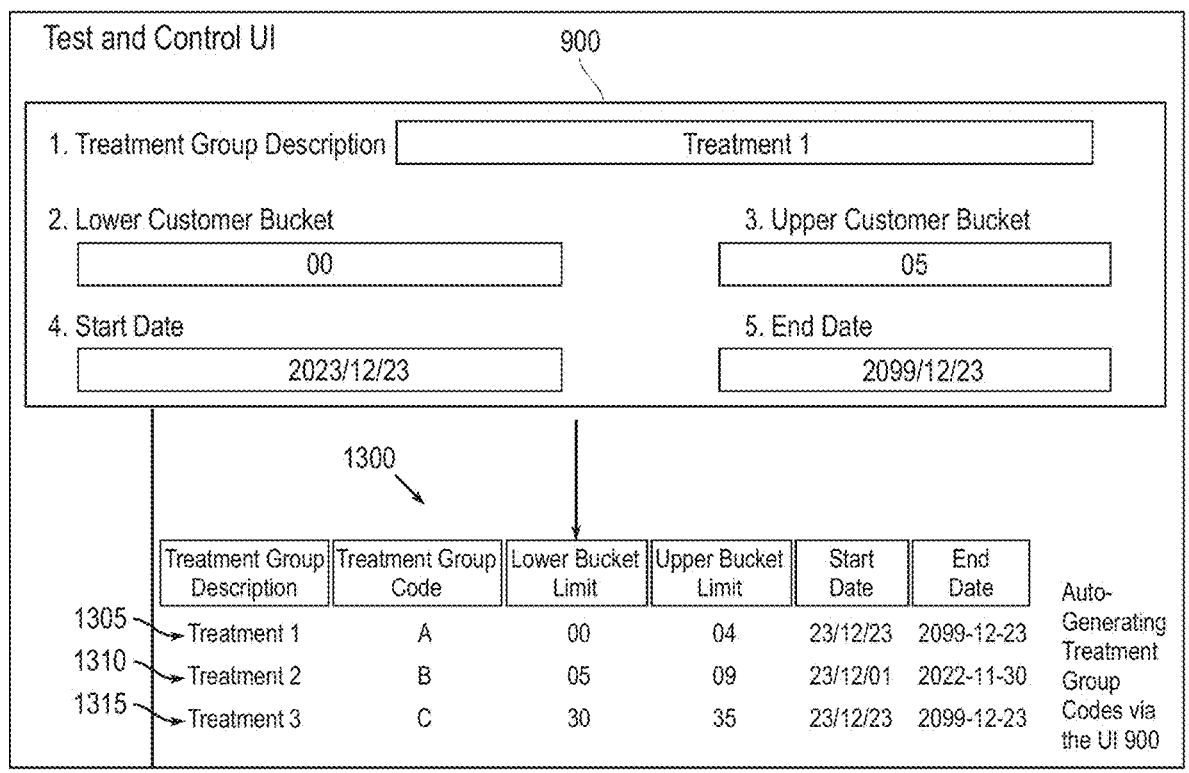
FIG. 19 illustrates an example testing and control graphical user interface and a corresponding configuration file that is automatically generated therefrom, in accordance with an example implementation of the present disclosure.

Referring now to FIG. 19, an example testing and control graphical user interface 900 is shown that prompts for and receives information that is usable to configure testing and control of treatments (e.g., different types of tests of content for respective user groups). Further, information associated with lower and upper customer buckets can be received and used for setting a range of customers within each of the buckets for the respective treatments. For example, Treatment Group Description is provided to prompt a user to provide a brief description for lower and upper ranges of buckets of customers (e.g., "Treatment 1"). Once submitted, the results can be used to define a configuration file 1300 (FIG. 13), such as Treatment Group description names, treatment group codes, lower and upper buck limits, and start/end dates.

Figure 20:
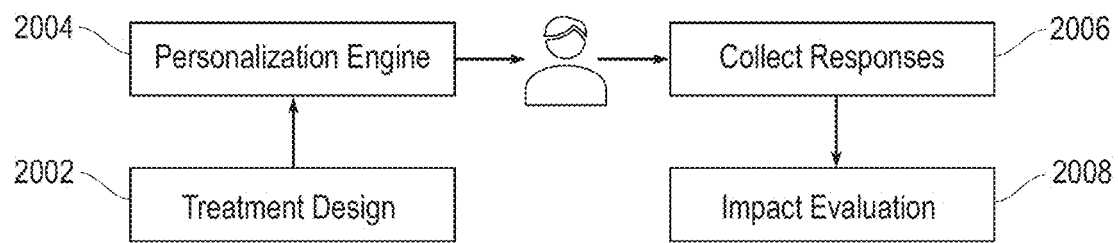
FIG. 20 is a block diagram illustrating modules and steps associated with a testing framework, in accordance with an example implementation of the present disclosure.

FIG. 20 is a block diagram illustrating modules and steps associated with a testing framework in accordance with an example implementation of the present disclosure. As illustrated in FIG. 20, treatment design module 2002 provides one or more treatments, which can be used by personalization engine 2004. Information associated with each of the treatment(s) can be received via testing and control graphical user interface 900 for the testing framework of the present disclosure. The treatment(s) can be provided to users as shown and described herein, and responses thereto can be received from the users (2006) for implementing the testing framework. Impact evaluation module 2008 of the testing framework, for example, can measure the effectiveness of respective algorithms. Details regarding impact evaluation are further shown and described herein.

The testing framework of the present disclosure operates to determine the effectiveness of each respective ones of a plurality of algorithms, including with regard to generating, selecting, formatting, and providing treatments. Technological aspects of the testing framework provide significant improvements for algorithm evaluation and marketing outreach. For example, multiple innovations and/or variants can operate simultaneously and the architecture of the present disclosure, including that support respective customer bucket assignments, testing design control groups, and operations associated with impact evaluation, improve the ability to measure the impact of effectiveness thereof.

Figure 21:
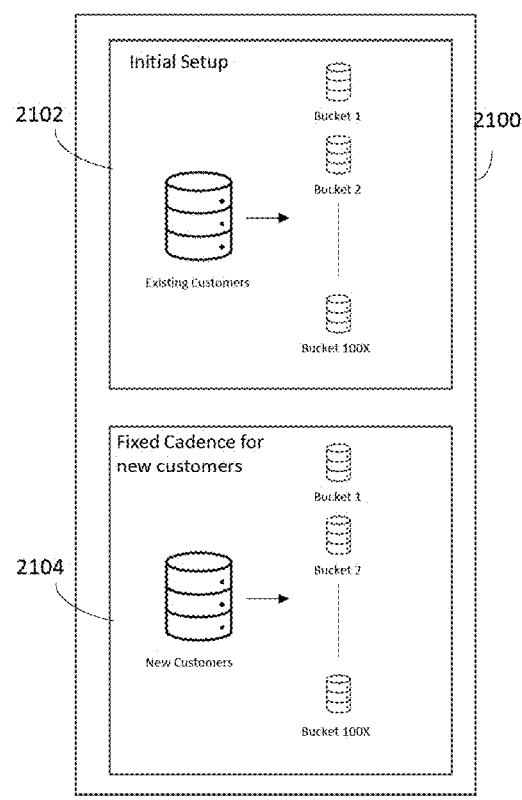
FIG. 21 is a block diagram illustrating initial setup of assigning existing customers to buckets, as well as new customers to buckets via a fixed cadence, in accordance with an example implementation of the present disclosure.

In one or more implementations of the present disclosure, control populations are not simply excluded from operations. Instead, control populations are designed and used for all customers, new or existing, which provides an effective way to eliminate bias in measuring impact, including bias that would otherwise be caused by addition of new customers. With regard to new customers, control populations can be managed, for example, within an existing (and possibly executing) control/test framework by including newly added customers to all buckets (Bucket 1-Bucket n) across all segments and testing groups. FIG. 21 is a block diagram illustrating initial setup of assigning existing customers to buckets 2102, as well as new customers to buckets 2102 in accordance with a fixed cadence. In addition to new customers, control population groups can be altered periodically and frequently within an existing (and executing) control/test framework.

Figure 22:
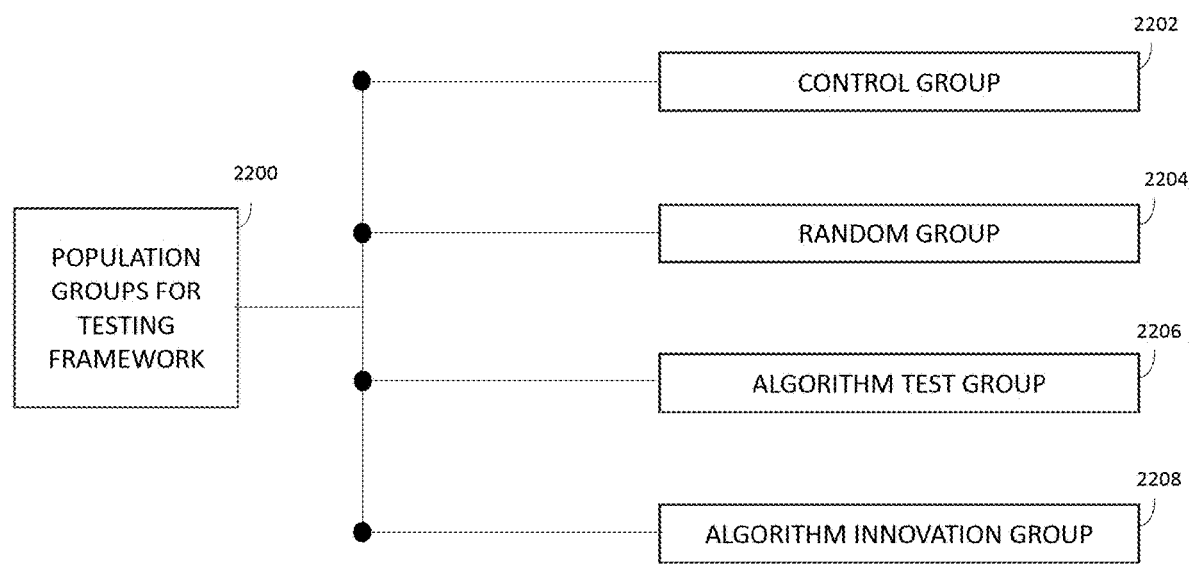
FIG. 22 is a block diagram illustrating distribution of population groups of customers for a testing framework, in accordance with an example implementation of the present disclosure.

FIG. 22 is a block diagram illustrating distribution of population groups 2200 of customers for a testing framework, in accordance with an example implementation of the present disclosure. Example population groups 2200 include control group 2202, random group 2204, algorithm test group 2206, and algorithm innovation group 2208. Bucket assignments for customers can be made as a function of information that is stored in customer profiles, such as information previously received from individuals in response to prompts and questions that represent demographics and preferences. In addition, or in the alternative, buck assignments for customers can be made randomly. Other profile information can represent the average time customers remain logged in to a particular website or software application, average activity and/or behavior within a website or software application, or virtually any other suitable information that is relevant or meaningful to a proprietor of the present disclosure. Applying profile information in connection with otherwise random assignments of customers to buckets to form segments for inclusion in respective groups, such as those shown in FIG. 2, ensures relative uniformity of bucket assignments of customers within a respective segment (e.g., buckets of customers group 1 through group n). Furthermore, buckets can be rotated among various group assignments, periodically, such as over 6 months or other suitable time periods.

Continuing with reference to FIG. 22, control group 2202 regards groups of customers that are not provided any messaging. By excluding messaging to the control group 2202, an impact of the control group on the entirety of the testing framework can be determined. A second testing group, random group 2204, operates as a form of an algorithm control group in which messaging provided to buckets of customers is based on no algorithm or artificial intelligence. In other words, messaging provided to the random group 2204 is provided randomly. A third testing group, algorithm test group 2206, regards messaging provided to buckets of customers based on a respective version of an algorithm. One or more other third test groups 2206 can provide messaging based on algorithmic variations, such as different versions of messages, different message sequences, different times messages are provided, frequency of messages, percentages of customers that should be reached in connection with a given message campaign, or other suitable measure. In one or more implementations of the present disclosure, algorithm innovation group 2208 can be included, such as by providing messaging to buckets of customers as a function of one or more enhanced algorithms, which can include newly developed algorithms and/or one or more algorithms that are significantly different than an algorithm used in algorithm test group 2206.

Figure 23:
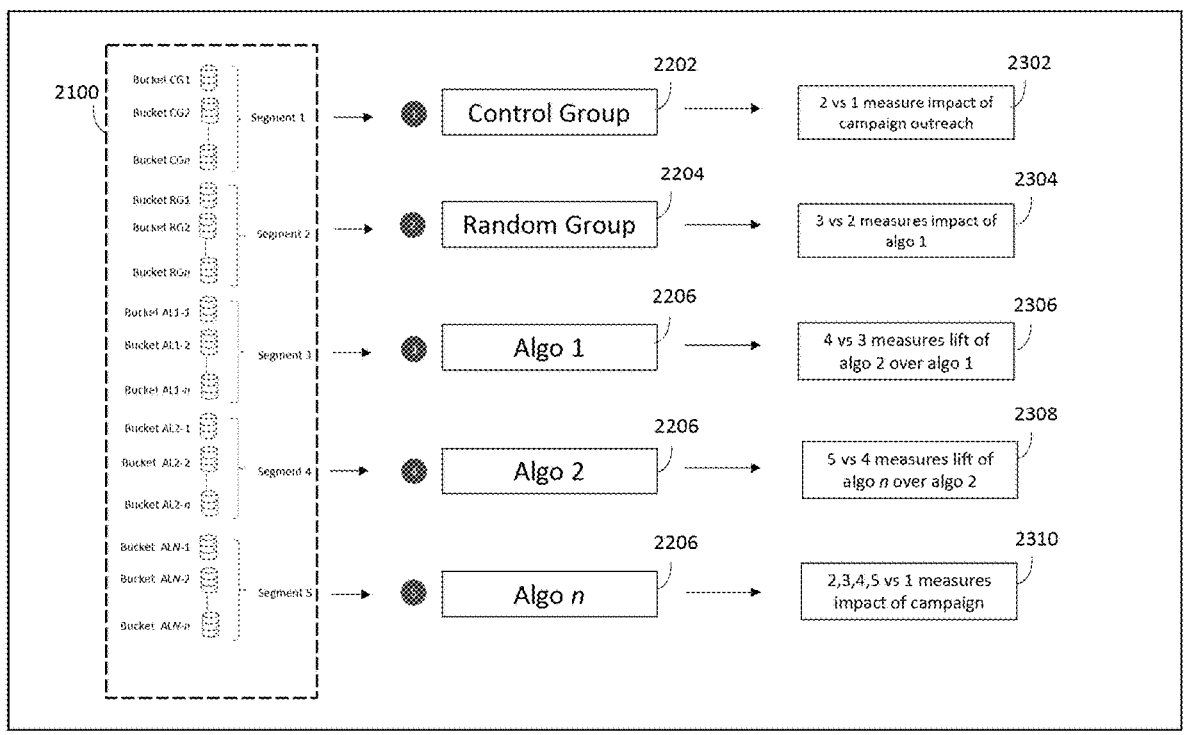
FIG. 23 is a block diagram illustrating modules and aspects associated with the testing framework, in accordance with an example implementation of the present disclosure.

FIG. 23 is a block diagram illustrating modules and aspects associated with the testing framework, in accordance with an example implementation of the present disclosure. During operation of the testing framework of the present disclosure, customers are assigned to buckets 2100 to, in which respective groups of buckets define segments. Testing groups, respectively comprising the segments, are provided messages (or not, as in the case of control group 2202) and effective measuring 2302 occurs as a function of metrics representing customer engagement. Various metrics can be measured or represented, such as the rate by which customers respond (e.g., by opening email in an testing framework involving an email campaign), the duration or degree of engagement (e.g., how long a customer views a video or how much of a message is viewed by a customer). Other metrics can measure or represent a degree or quality of customer response to a messaging campaign (e.g., whether a customer opens a new account, logs into an existing account), as well as one or more respective conversions (e.g., whether a customer completes a purchase). Other relevant metrics can be associated with one or more subscriptions, such as new subscriptions or whether customers unsubscribe.

The metrics determined and measured, such as shown and described herein, can be identified and quantified via machine learning and artificial intelligence, and used in determining impact evaluation. For example, and with continued reference to FIG. 23, impact variation 2302 can represent the results of a measurement of the impact of campaign outreach, as a function of a comparison of random group 2204 versus control group 2202. Moreover, impact variation 2304 can represent the results of a determination of the impact of Algorithm 1 2206 (via customer segment 2) as a function of a comparison of algorithm 1 2206 versus random group 2204. Moreover, impact variation 2306 can represent the results of a determination of increased engagement (e.g., the "lift") of Algorithm 2 2206 as a function of a comparison of Algorithm 2 2206 over Algorithm 1 2206. Still further, impact variation 2308 can represent the results of a lift of Algorithm n 2206 as a function of a comparison of Algorithm n 2206 over Algorithm 2 2206. Thereafter, measurements of all respective testing groups 2310, except control group 2202, can be compared to control group 2202 to measure an overall impact of a respective campaign.

In one or more implementations of the present disclosure, decisions can be made automatically, for example, as a function of machine learning and artificial intelligence based on comparisons and quantitative analyses, such as those described herein. For example, one or more algorithms can be automatically selected, bucket assignments can be automatically altered, segments of customers can be automatically rearranged, various aspects of a campaign (e.g., frequency of delivery, formatting, content selection, or the like) can be scaled up or down automatically, as a function of analyses performed by one or more computing devices associated with the testing framework of the present disclosure.

Accordingly, the testing framework of the present disclosure is highly effective to evaluate the impact and effectiveness of multiple components, including customer outreach, algorithms, and various technological innovations regardless of application or domain, as a function of metrics that can be assessed and measured via machine learning and artificial intelligence, and which can be applied in comparative formulations and operations to determine the effectiveness and impact of respective control groups (e.g., customer segments) and corresponding algorithms. The testing framework of the present disclosure operates to improve the personalization engine, by providing respective campaigns that are well-suited and highly effective across a wide and various customer base. Furthermore, the architecture of the testing framework of the present disclosure supports large numbers of campaigns that are dynamic and require frequent revisions, such as new content, new formats, and compliance with eligibility rules that often change. The present disclosure supports altering procedures as a function of types, formats, vehicles, and delivery frequency of content, among other variables, and determining the most effective and enhanced approach thereof and therefor, for a new or altered campaign.

Further, the present disclosure is highly effective to evaluate each of a plurality of components associated with the personalization engine, as opposed to merely evaluating whether an entire program is working. The present disclosure improves recommender systems, for example, by providing enhanced testing that are based on individual and even partial components thereof. Each component (or part thereof) is effectively evaluated by the present disclosure, and is well-integrated into the personalization engine. Also, the present disclosure effectively handles integrating new customers into existing and operational personalization engine, including by integrating new customers into the testing framework during testing and evaluation procedures. Assignments of new and existing customers into segments, for example, via a plurality of buckets, is improved by the technology shown and described herein, including at a single moment and over periods of time. The impact of campaign variables, including the effectiveness of a particular model on even a small population, can be measured over such time period(s), in accordance with the teachings herein.

It is to be recognized that may of the examples shown and described herein, including with reference to the drawings, represent simple implementations in terms of the numbers of customers, the number of customer segments and corresponding testing groups, algorithms, and the like, however the present disclosure is not so limited. Highly complex and large scale implementations are supported in accordance with the teachings herein.

Referring again to FIG. 2, using the information entered into the UI 900, a testing and control processing module 235 assembles the treatment group for testing in the manner discussed above. The testing and control processing module 235 delivers the treatment groups to machine learning (ML) algorithm module 260 which includes a plurality of ML algorithms or other logic. The model ML algorithm module 260 receives as input curated feature data from the curated feature database 210, content items from the content repository 225, as well the treatment groups. The ML algorithms perform the "treatments" which typically involve determining a ranking of content items according to the characteristics of the end users in the treatment groups. In some cases, the algorithms may not use machine learning but may be based on another method, such as random sorting. With this caveat in mind, module 260 is referred to as an ML algorithm module for ease of reference. Using the multiple treatments, certain content is ranked through algorithm A, further content is ranked through algorithm B, still further content is ranked through algorithm C, and so on. The rankings are based on the calculated likelihood that a customer will engage with the content item. Based on the assessment objective (for example, propensity to respond to a content piece) the top ranked content is the top prediction from the algo and so on. Multiple ML algorithms are used as each has slightly different characteristics which can affect the ranking of content. As it is not necessarily known ahead of time which algorithm will provide the most useful ranking, a number of different rankings are produced for testing and/or production.

Figure 15:
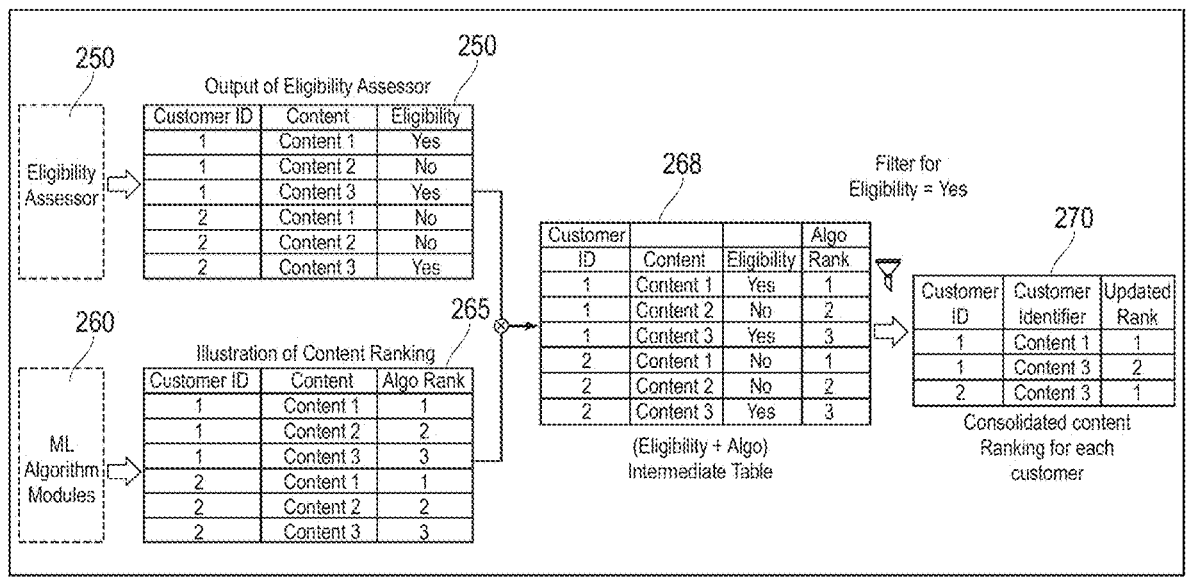
FIG. 15 is a schematic illustration of a process of combining the content ranking output from the ML algorithms with the output from the eligibility assessor according to an embodiment of the present disclosure.

The output from the ML (or other) algorithms of module 260 is an initial set of content rankings from each algorithm 265. The initial set of content rankings 265 is logically combined with the output from the eligibility assessor 250 into a set of eligible rankings 270. FIG. 15 schematically illustrates the process of combining the content ranking output from the ML algorithms 260 with the output from the eligibility assessor 250. As shown in the figure, the eligibility assessor outputs a relational table 255 (which can be implemented in various ways) that lists a number of content items that are associated with an end user ID (as shown several content items can be associated with a single end user ID). Each content item is also associated with an eligibility tag. The ML algorithm module similarly outputs a relational table 265 which is one implementation of the initial content ranking. As shown, the relational table 265 also includes a number of content items, each content item being associated with an end user ID. In relational table 265, each content item is also associated with an algorithmic content ranking. Relational tables 250, 265 are combined in an intermediate table 268, which includes the combined information, end user IDs, content items, eligibility tags and algorithmic ranking. The intermediate relational table 268 is then converted into a consolidated content ranking 270 which removes any content that has been tagged as ineligible and also updates the content ranking to account for content items removed.

At this point in the process, input from an additional strategic overrides UI 228 can be used to modify the eligible content rankings. A strategic override can be used to effective override a prioritization (ranking) recommendation of an ML algorithm. As shown in FIG. 2, strategic override UI 228 is coupled to the consolidated content ranking 270.

Figure 16A:
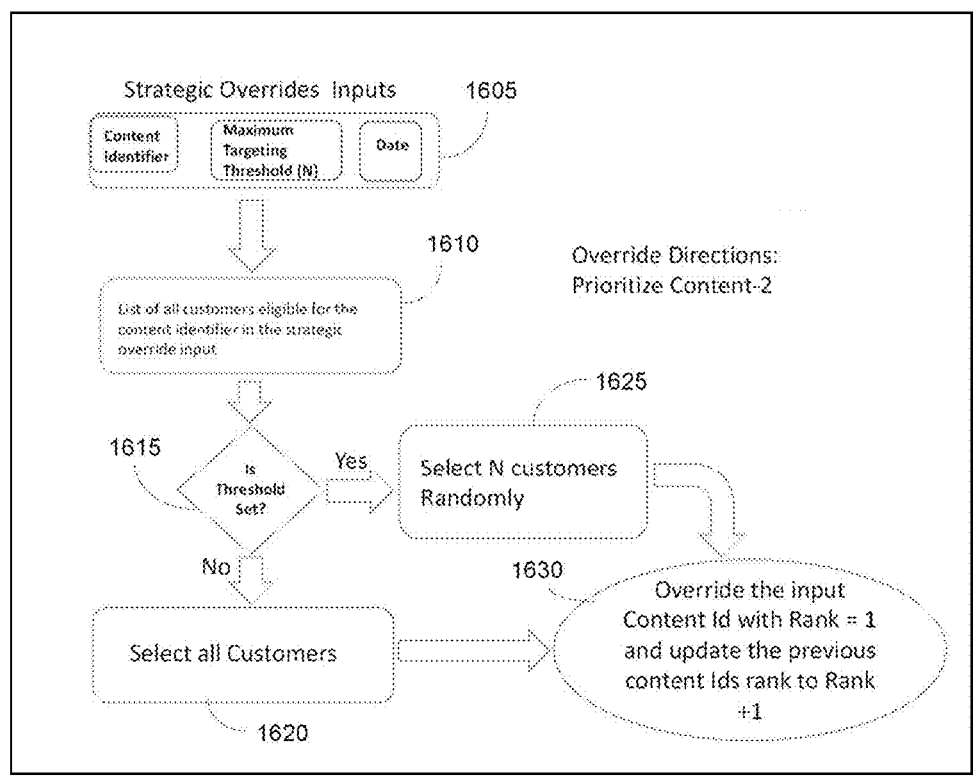
FIG. 16A is a schematic diagram of a strategic override process that can be utilized in embodiments of the personalization engine of the present disclosure.
Figure 16B:
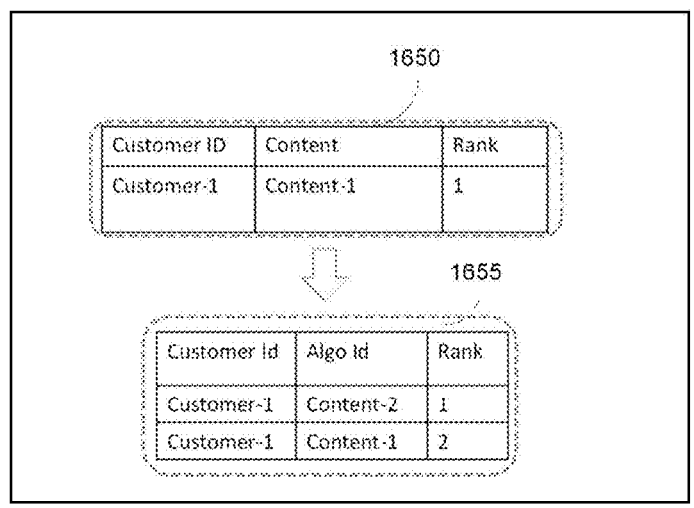
FIG. 16B is an illustration of the updating process of one of the steps shown in FIG. 16A.

FIG. 16A is a schematic diagram of a strategic override process that can be utilized in embodiments of the personalization engine of the present disclosure. The override is limited to certain customers and does not impact the remaining customers in a given campaign. In step 1605 of the strategic override process input data is received via the strategic overrides UI. The input data includes, but is not limited to, a content identifier to be prioritized, a maximum targeting threshold, and a date. The maximum targeting threshold (N) is an optional input defines the number of end users to which the content item is to be delivered. The input date is the date of content delivery. In step 1610, a list of all end users eligible for the specified content input via the strategic override input is obtained from the output of the eligibility assessor 250. In step 1615 it is determined whether the number of end users eligible for the content in the list is greater than the maximum targeting threshold (N). If the number of end users is below the threshold, then all end users are selected in step 1620. If the number of end users is above the threshold (N), then N end users are randomly selected in step 1625. In either case (regardless of the number of end users selected) the process flows to step 1630, in which the highest ranked content (rank=1) is overridden and the ranking is increased by one. FIG. 16B illustrates the updating process of step 1630 of FIG. 16A. An initial entry 1650 shows a table row in which for end user 1, content ID 1 has a ranking of 1. In the following updated entry 1655, there are two rows, corresponding to content ID 1 for end user 1, and content ID 2 also for end user 1. The ranking of content 1 has been moved down to 2, and the ranking of content 2 has been moved up to 1, thus prioritizing content ID 2 over content ID 1, overriding the recommendation of the ML algorithm which prioritizes content ID 1 over content ID 2. In case there are multiple overrides for an end user, overrides are applied based on their input order.

Returning to FIG. 2, once the consolidated content ranking 270 has been modified by the overrides configured using the strategic overrides UI 228, the ranked content is sent over orchestration channels 275 to the various end users (e.g., over the various end user levels) in a distribution campaign. After the content has been delivered, a feedback processor 280 obtains activation information and other types of feedback from the end users (e.g., responses to the content such as clicks, full responses, purchases or subscriptions) and converts this feedback into raw data which is gathered at a feedback data repository 285. The feedback data repository is one of the sources of the raw data 205 used as input for the curated features warehouse 285 as well as a source of information for the algorithms of the ML algorithm module 260. The feedback is standardized by the feedback processor 280 to capture the customer targeted, the content item used, the channel through which it is delivered, and the response/engagement. This standardization allows dynamic addition of channels and content.

Figure 17:
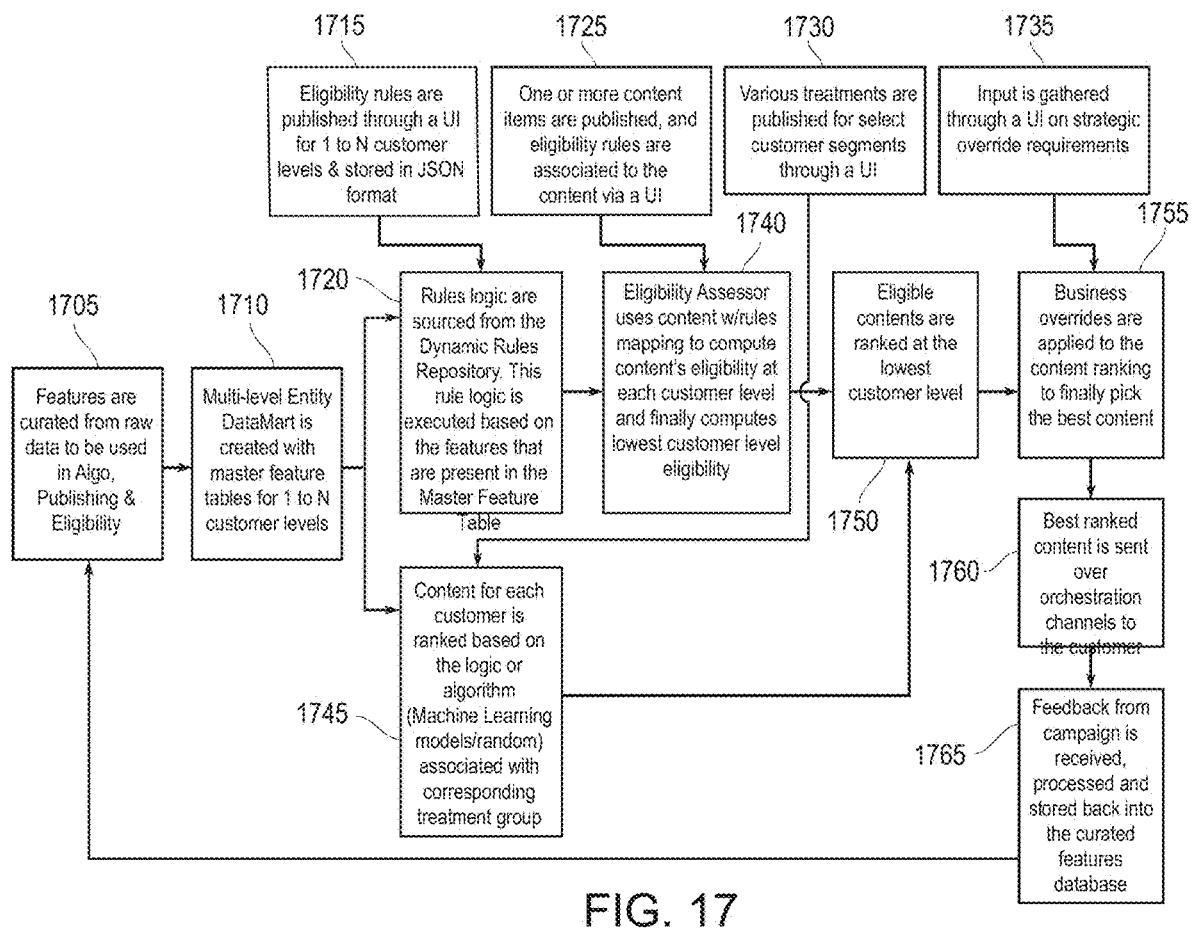
FIG. 17 is a general flow chart of an exemplary method for determining optimal content to deliver to a particular end user according to the present disclosure.

FIG. 17 is a general flow chart of an exemplary method for determining optimal content to deliver to a particular end user (e.g., client or customer) according to the present disclosure. It is noted at the outset that the order of the processes described is exemplary and that the steps can be performed in other sequences. In a first step 1705, features concerning end users are curated from raw data. In a second step 1710, a multi-level entity Data Mart is created with master feature tables for 1 to N customer levels. In a following step 1715, eligibility rules are published through a UI for 1 to N customer levels and stored in JSON format in a dynamic rules repository. In step 1720, rules logic configurations are sourced from the dynamic rules repository and executed based on the curated features that are present in the master feature tables. In step 1725, one or more content items are published and eligibility rules are associated with (mapped to) the content, using a UI. Various treatments are published for select end user segments through a UI in step 1730. Step 1730 can be performed in a different sequence or in parallel with steps 1720, 1725. In step 1735, input is gathered through a UI on strategic override requirements. In a following step 1740, the eligibility assessor uses the content mapped to the eligibility rules with rules mapping to compute content's eligibility at each end user level and computes the lowest end user level eligibility. Sequentially or in parallel, in step 1745, content for each end user is ranked using a machine learning algorithm based on the algorithm logic or algorithm (e.g., machine learning or other logic, such as random sorting) associated with corresponding treatment group. Step 1750 combines the outputs of steps 1740 and 1745 by combining ranking with eligibility criteria and outputs a ranking eligible content at the lowest end user level. In step 1755, strategic overrides are applied to arrive at a final content ranking. The final content ranked according to end user is sent over orchestration channels to the end users in step 1760. In step 1765, feedback from the campaign (end users) is received, processed and stored in the curated features database, feeding back to initial step 1705.

The personalized content engine described herein has a number of advantageous features. The various user interfaces enable users to dynamically create, add, edit and remove content items and metadata related to the content items. The N-level data mart provides a "master" repository for curated features at N-levels based that determines the eligibility of all content based on business requirements. Using the N-level data mart, the rules processing unit automatically executes dynamic rules for multiple customers in scalable and non-redundant style at various levels. Rules are executed at entity level only once and using only one master table. The eligibility assessor automatically calculates the eligibility for multiple customers across various content-ideas dynamically and efficiently. Additionally, bucketing customers into multiple segments enables quality testing of the results from multiple algorithms for the purpose of determining the best course of action. This promotes the ability to target a strategic idea to a defined set of targets which can override existing recommendations for the selected targets. The personalized content engine is scalable, microservice based to support faster development.

Furthermore, the architecture of personalization engine according to the present disclosure architecture is highly modular, with low coupling among different modules. This leads to easy management of the codebase, faster time for development and deployment, and ease of use for operating the personalization engine. For example, refreshment or updating of a content strategy does not require updating eligibility assessment of content pieces. This allows new content strategies to utilize existing eligibility logic, due to the clear modular separation between the eligibility rules processing and the model ranking algorithms. This modular separation is another feature that enables rapid and agile deployment of new personalization engine content strategies. The loosely coupled architecture also allows the convenient addition of add-one modules directed to new features of the personalization engine.

The personalization engine is implemented using one or more computing devices having processing and storage resources that execute computer-readable instructions. The end users, program modules, and various data stores can be coupled over one or more public or private networks. The public or private networks can include an intranet, the Internet, a cellular network, a local area network, or any other such network or combination thereof. Communication over the network can be enabled via wired or wireless connections and combinations thereof.

More generally, the methods and processes described herein are performed by multiple computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions stored in a memory or other non-transitory computer-readable storage medium or device (e.g., solid state storage devices, disk drives, etc.). The various functions performed by any of the modules (e.g., the eligibility logic 110 and its modules, and all of the other modules discussed herein) are typically embodied in program instructions that execute within a hardware processor or which are implemented in application-specific circuitry (e.g., ASICs or FPGAs) of the computer system. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods and algorithms described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

The present disclosure also includes the following points:

Point 101: A computer-implemented method for delivering personalized content items at scale to end users, the method, executed by one or more hardware processing units of a computing system, comprising:
  creating a database of curated feature data including a plurality of extracted features pertaining to end users;
  providing a rule publishing interface for configuring eligibility rules for a plurality of customer levels using the curated feature data;
  providing a content publishing interface for adding or editing a plurality of content items and associating the eligibility rules with the one or more content items, the eligibility rules determining whether the content items are to be delivered to end users;
  applying the eligibility rules separately for each of the plurality of customer levels and assessing the eligibility of each of the content items for the end users of each customer level;
  executing a plurality of machine learning algorithms using the content items and curated feature data as inputs and configured to determine a ranking of the content items for likelihood of customer engagement;
  combining the ranking of content items with the applied eligibility rules to output an eligible content ranking;
  orchestrating delivery of the content according to eligible content ranking to the end users of the distinct customer levels;
  receiving feedback on engagement from the end users; and
  incorporating the feedback on engagement to update the machine learning algorithms and curated feature data.

Point 102: The computer-implemented method of Point 101, further comprising prior to applying the eligibility rules, dividing the curated feature data according to customer level into an N-level data mart, in which a separate repository is allocated to each customer level.

Point 103: The computer-implemented method of Point 102, wherein each separate repository constitutes a master table.

Point 104: The computer-implemented method of Point 101, further comprising providing a strategic override interface for setting override inputs that can be used to modify one or more entries of the eligible content ranking.

Point 105: The computer-implemented method of Point 104, wherein at least one override substitutes content targeted to a particular end user that is different from content recommended to the same end users according to the eligible content ranking as determined by at least one machine learning algorithm.

Point 106: The computer-implemented method of Point 104, wherein at least one override excludes specific content entries from the eligible content ranking.

Point 107: The computer-implemented method of Point 101, further comprising storing the eligibility rules created using the rule publishing interface in a distinct dynamic rule repository to facilitate execution of the eligibility rules.

Point 108: The computer-implemented method of Point 103, wherein the eligibility rules are applied to the curated feature data only once for each of the plurality of customer levels using a single master table for each customer level.

Point 109: The computer-implemented method of Point 101, further comprising:
  implementing multiple machine learning models having different methodologies for ranking content items for end users based on curated feature data;
  dividing the end users among a plurality of representative sections;
  further dividing each of the representative sections into a plurality of corresponding treatment segments; and
  providing end user information for each treatment segment to a single one of multiple machine learning models;
  wherein each end user segment is treated differently according to the machine learning model to which it is provided.

Point 110: The computer-implemented method of Point 109, further comprising validating the plurality of sections for representativeness and randomness.

Point 111: The computer-implemented method of Point 101, wherein the curated feature data is derived from one or more of: demographic and financial data, historical transaction data, external intelligence data, client relationship and preference information, and client relationship graphs.

Point 112: A system for delivering personalized content items at scale to end users comprising:
  a curated feature database that stores curated feature data including a plurality of extracted features pertaining to end users;
  a first user interface for rule publishing that is configured for setting eligibility rules for a plurality of customer levels using data from the curated feature database;

a second user interface for content publishing configured for adding or editing a plurality of content items and associating the eligibility rules with the one or more content items, the eligibility rules determining whether the content items are to be delivered to end users;

a rules processing unit configured to applying the eligibility rules separately for each of the plurality of customer levels;

an eligibility assessor module configured to assess the eligibility of each of the content items processed by the rules processing module;

a machine learning model module configured to execute a plurality of machine learning algorithms each of which ingest information from the curated feature database and the added content items and is configured to determine a ranking of the content items for likelihood of customer engagement;

a combining logic module coupled to the machine learning model unit and the eligibility assessor and configured for combining the ranking of content items with the applied eligibility rules to output an eligible content ranking; and one or more communication units coupled to the combining logic module and configured to orchestrate delivery of the content according to eligible content ranking to the end users of the distinct customer levels and to receive feedback on engagement from the end users, wherein the machine learning model module is configured to receive and incorporate the feedback on engagement to update the machine learning algorithms.

Point 113: The system of Point 112, further comprising an N-level data mart including N repositories, each of the N repositories contain the curated feature data corresponding to a specific customer level.

Point 114: The system of Point 113, wherein each of the N repositories of the N-level data mart constitutes a master table.

Point 115: The system of Point 112, further comprising a strategic override user interface configured for setting override rules that can be used to modify one or more entries of the eligible content ranking.

Point 116: The system of Point 115, wherein at least one override rule substitutes content targeted to a particular end user that is different from content recommended to the same end users according to the eligible content ranking.

Point 117: The system of Point 115, wherein at least one override rule excludes specific content entries from the eligible content ranking.

Point 118: The system of Point 112, further comprising a dynamic rule repository that stores the eligibility rules using the rule publishing user interface.

Point 119: The system of Point 114, wherein the eligibility assessor module applies eligibility rules only once for each of the plurality of customer levels using a single master table derived from the N-level data mart.

Point 120: The system of Point 112, further comprising a testing and processing module configured to allocate each of the end users to a plurality of sections in which distinct groups of end users are allocated according to level and to generate segments from each of the plurality of section, each of the segments containing a portion of a section, and each segment being allocated for testing on a distinct machine learning algorithm.

Point 121: The system of Point 120, wherein the testing and processing module is further configured to validate the plurality of sections for representativeness and randomness.

Point 122: The system of Point 112, wherein the curated feature data is derived from one or more of: demographic and financial data, historical transaction data, external intelligence data, client relationship and preference information, and client relationship graphs.

The present disclosure further includes the following points:

Point 201: A computer-implemented method for testing content to be provided to a plurality of end users, the method, executed by one or more hardware processing units of a computing system, comprising:

assigning each of the plurality of end users to a single user group ("bucket");

creating a treatment for testing content to be provided to the plurality of end users;

assigning a plurality of buckets to the treatment, wherein the treatment is applied solely to the end users within the plurality of buckets assigned to the treatment; and applying the treatment by delivering content to the plurality of end users that according to a specific selection algorithm that corresponds to the treatment.

Point 202: The computer-implemented method of Point 201, further comprising determining whether the plurality of buckets meet validity requirements.

Point 203: The computer-implemented method of Point 202, wherein conditions for validity include a threshold level or randomness and a threshold level of representativeness.

Point 204: The computer implemented method of Point 201, further comprising reassigning one or more end users to different buckets if it is determined that at least one bucket does not meet the validity requirements.

Point 205: The computer implemented method of Point 201, further comprising updating the plurality of buckets to include new end users and to remove non-participating end users.

Point 206: A non-transitory computer-readable medium comprising instructions which, when executed by a computing system, cause the computer system to carry out a method for providing personalized content to end users, including the steps of:

assigning each of the plurality of end users to a single user group ("bucket");

creating a treatment for testing content to be provided to the plurality of end users;

assigning a plurality of buckets to the treatment, wherein the treatment is applied solely to the end users within the plurality of buckets assigned to the treatment; and applying the treatment by delivering content to the plurality of end users that according to a specific selection algorithm that corresponds to the treatment.

Point 207: The non-transitory computer-readable medium of Point 206, further including instructions for causing a computer system to perform a step of determining whether the plurality of buckets meet validity requirements.

Point 208: The non-transitory computer-readable medium of Point 206, further including instructions for causing a computer system to perform a step of determining whether the plurality of buckets meet validity requirements.

Point 209: The non-transitory computer-readable medium of Point 207, further including instructions for causing a computer system to perform a step of reassigning one or more end users to different buckets if it is determined that at least one bucket does not meet the validity requirements.

Point 210: The non-transitory computer-readable medium of Point 206, further including instructions for causing a computer system to perform a step of updating the plurality of buckets to include new end users and remove non-participating end users.

In addition, the present disclosure also includes the following points:

Point 301: A computer-implemented method for delivering personalized content items to customers, the method comprising:
  accessing, by at least one processor configured by executing instructions stored on non-transitory processor readable media:
    a customer database storing customer profile information respectively associated with each of a plurality of customers;
    a content repository storing content items to be provided the plurality of customers; and
    an algorithm database storing information associated with a plurality of algorithms, wherein each of the plurality of algorithms includes instructions for providing respective ones of the content items to respective subsets of the plurality of customers;
  defining, by the at least one processor, a plurality of mutually exclusive customer treatment groups comprising respective subsets of the plurality of customers, including:
    a control customer treatment group customer segment that includes a subset of the plurality of customers excluded from receiving the content items;
    a random customer treatment group that includes a subset of the plurality of customers selected to randomly receive at least some of the content items;
    a first algorithm customer treatment group that includes a subset of the plurality of customers to receive at least some of the content items in accordance with a first algorithm; and
    a second algorithm customer treatment group that includes a subset of the plurality of customers to receive at least some of the content items in accordance with a second algorithm,
    wherein at least the customers in the first algorithm customer treatment group and the of customers in the second algorithm customer treatment group are selected for inclusion uniformly as a function of at least some of the customer profile information;
  respectively providing, by the at least one processor, content items to the random customer treatment group, the first algorithm customer treatment group, and the second algorithm customer treatment group;
  determining, by the at least one processor, metrics representing at least engagement with the respectively provided content items by each of the customers in the control customer treatment group, the random customer treatment group, the first algorithm customer treatment group, and the second algorithm customer treatment group;
  selecting, by the at least one processor as a function of analyzing the metrics, at least one of the first algorithm and the second algorithm, wherein the step of selecting is made at least by:
    comparing the metrics associated with the random customer treatment group with the metrics associated with the control customer treatment group;
    comparing the metrics associated with the first algorithm customer treatment group with the metrics associated with the random customer treatment group;
    comparing the metrics associated with the second algorithm customer treatment group with the metrics associated with the first algorithm customer treatment group; and
    comparing the metrics associated with each of the random customer treatment group, the first algorithm customer treatment group, and the second algorithm customer treatment group with the metrics associated with the control customer treatment group; and
  respectively providing, by the at least one processor, to at least some of the plurality of customers, content items in accordance with the selected algorithm.

Point 302: The computer-implemented method of Point 301, wherein at least one of the customer treatment groups is further defined by:
  defining, by the at least one processor, a size of a group of customers ("bucket");
  providing, by the at least one processor, a graphical user interface;
  receiving, by the at least one processor via the graphical user interface, a lower bucket value representing a starting value and an upper bucket value representing an ending value;
  defining, by the at least one processor, as a function of the lower bucket value and the upper bucket value, a range of respective buckets; and
  allocating, by the at least one processor as a function of the defined range, customers to the respective ones of the buckets for the at least one of the customer treatment groups.

Point 303: The computer-implemented method of Point 302, further comprising:
  validating, by the least one processor, at least some of the buckets of customers to ensure at least one of a random distribution of customers, at least one similarity of customers within each bucket, and that each bucket includes a representation of a cross-section of the plurality of customers; and
  reassigning respective customers to each of the buckets after determining the at least some of the buckets fail the step of validating.

Point 304: The computer-implemented method of Point 301, wherein the step of analyzing the metrics further includes:
  applying, by the at least one processor, at least one of machine learning and artificial intelligence to the metrics to evaluate, simultaneously, the impact of at least the first algorithm and the second algorithm on the respective customer treatment groups.

Point 305: The computer-implemented method of Point 304, further comprising:
  revising, by the at least one processor, at least some of the respective content items by providing at least one of: new content; a new or different format of content; a new or different delivery channel; and a new or different frequency of delivery.

Point 306: The computer-implemented method of Point 304, further comprising:
  updating, by the at least one processor as a function of the machine learning and/or the artificial intelligence, at least some of the customer profile information for future delivery of content items.

Point 307: The computer-implemented method of Point 301, wherein at least some of the customer profile information represents at least one of previous engagement with content items and customer demographics.

Point 308: The computer-implemented method of Point 301, wherein the first algorithm and the second algorithm have at least one common aspect, and further comprising:
defining, by the at least one processor, for the content items, an algorithm innovation customer treatment group that includes a subset of the plurality of customers to receive content items in accordance with a third algorithm that does not have the common aspect.

Point 309: The computer-implemented method of Point 301, wherein delivery of at least some of the content items in accordance with the first algorithm and the content items in accordance with the second algorithm is based on at least one of:
a respective version of the content items;
respective sequences of content delivery;
respective times of content delivery; and respective frequencies of content delivery.

Point 310: The computer-implemented method of Point 301, wherein the metrics represent at least one of:
a rate of customer response;
a duration of customer engagement;
a degree of customer engagement; and
a quality of customer engagement.

Point 311: A computer-implemented system for delivering personalized content items to customers, the system comprising:
at least one processor that, when executing instructions stored on non-transitory processor readable media is configured to:
access:
a customer database storing customer profile information respectively associated with each of a plurality of customers;
a content repository storing content items to be provided the plurality of customers; and
an algorithm database storing information associated with a plurality of algorithms, wherein each of the plurality of algorithms includes instructions for providing respective ones of the content items to respective subsets of the plurality of customers;
define a plurality of mutually exclusive customer treatment groups comprising respective subsets of the plurality of customers, including:
a control customer treatment group that includes a subset of the plurality of customers excluded from receiving the content items;
a random customer treatment group that includes a subset of the plurality of customers selected to randomly receive at least some of the content items;
a first algorithm customer treatment group that includes a subset of the plurality of customers to receive at least some of the content items in accordance with a first algorithm; and
a second algorithm customer treatment group that includes a subset of the plurality of customers to receive at least some of the content items in accordance with a second algorithm,
wherein at least the customers in the first algorithm customer treatment group and the customers in the second algorithm customer treatment group are selected for inclusion uniformly as a function of at least some of the customer profile information;
respectively provide content items to the random customer treatment group, the first algorithm customer treatment group, and the second algorithm customer treatment group;
determine metrics representing at least engagement with the respectively provided content items by each of the customers in the control customer treatment group, the random customer treatment group, the first algorithm customer treatment group, and the second algorithm customer treatment group;
select, as a function of analyzing the metrics, at least one of the first algorithm and the second algorithm, wherein the step of selecting is made at least by:
comparing the metrics associated with the random customer treatment group with the metrics associated with the control customer treatment group;
comparing the metrics associated with the first algorithm customer treatment group with the metrics associated with the random customer treatment group;
comparing the metrics associated with the second algorithm customer treatment group with the metrics associated with the first algorithm customer treatment group; and
comparing the metrics associated with each of the random customer treatment group, the first algorithm customer treatment group, and the second algorithm customer treatment group with the metrics associated with the control customer treatment group; and
respectively provide, to at least some of the plurality of customers, content items in accordance with the selected algorithm.

Point 312: The computer-implemented system of Point 311, wherein at least one of the customer treatment groups is further defined by:
defining a size of a group of customers ("bucket");
providing a graphical user interface;
receiving, via the graphical user interface, a lower bucket value representing a starting value and an upper bucket value representing an ending value;
defining, as a function of the lower bucket value and the upper bucket value, a range of respective buckets; and
allocating, as a function of the defined range, customers to the respective ones of the buckets for the at least one of the customer treatment groups.

Point 313: The computer-implemented system of Point 312, wherein the at least one processor, when executing instructions stored on the non-transitory processor readable media, is further configured to:
validate at least some of the buckets of customers to ensure at least one of a random distribution of customers, at least one similarity of customers within each bucket, and that each bucket includes a representation of a cross-section of the plurality of customers; and
reassign respective customers to each of the buckets after determining the at least some of the buckets fail the step of validating.

Point 314: The computer-implemented system of Point 311, wherein analyzing the metrics further includes:
applying at least one of machine learning and artificial intelligence to the metrics to evaluate, simultaneously, the impact of at least the first algorithm and the second algorithm on the respective customer treatment groups.

Point 315: The computer-implemented system of Point 314, wherein the at least one processor, when executing instructions stored on the non-transitory processor readable media, is further configured to:
revise at least some of the respective content items by providing at least one of: new content; a new or different format of content; a new or different delivery channel; and a new or different frequency of delivery.

Point 316: The computer-implemented system of Point 314, wherein the at least one processor, when executing instructions stored on the non-transitory processor readable media, is further configured to:
update, as a function of the machine learning and/or the artificial intelligence, at least some of the customer profile information for future delivery of content items.

Point 317: The computer-implemented system of Point 311, wherein at least some of the customer profile information represents at least one of previous engagement with content items and customer demographics.

Point 318: The computer-implemented system of Point 311, wherein the first algorithm and the second algorithm have at least one common aspect, and further wherein the at least one processor, when executing instructions stored on the non-transitory processor readable media, is further configured to:
define, for the content items, an algorithm innovation customer treatment group that includes a subset of the plurality of customers to receive content items in accordance with a third algorithm that does not have the common aspect.

Point 319: The computer-implemented system of Point 311, wherein delivery of at least some of the content items in accordance with the first algorithm and the content items in accordance with the second algorithm is based on at least one of:
a respective version of the content items;
respective sequences of content delivery;
respective times of content delivery; and
respective frequencies of content delivery.

Point 320: The computer-implemented system of Point 311, wherein the metrics represent at least one of:
a rate of customer response;
a duration of customer engagement;
a degree of customer engagement; and
a quality of customer engagement.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the disclosure has been described with reference to exemplary embodiments, it will be understood by those skilled in the art that various changes may be made and equivalents may be substituted for elements thereof without departing from the scope of the disclosed invention. In addition, many modifications will be appreciated by those skilled in the art to adapt a particular instrument, situation or material to the teachings of the disclosure without departing from the essential scope thereof. Therefore, it is intended that the invention not be limited to the particular embodiment disclosed as the best mode contemplated for carrying out this invention, but that the invention includes all embodiments falling within the scope of the appended claims.

What is claimed is:

1. A computer-implemented method for delivering personalized content items to customers, the method comprising:
accessing, by at least one processor configured by executing instructions stored on non-transitory processor readable media:
a customer database storing customer profile information respectively associated with each of a plurality of customers;
a content repository storing content items to be provided the plurality of customers; and
an algorithm database storing information associated with a plurality of algorithms, wherein each of the plurality of algorithms includes instructions for providing respective ones of the content items to respective subsets of the plurality of customers;
defining, by the at least one processor, a plurality of mutually exclusive customer treatment groups comprising respective subsets of the plurality of customers, including:
a control customer treatment group customer segment that includes a subset of the plurality of customers excluded from receiving the content items;
a random customer treatment group that includes a subset of the plurality of customers randomly selected to receive a subset of the content items;
a first algorithm customer treatment group that includes a subset of the plurality of customers to receive a subset of the content items in accordance with a first algorithm; and
a second algorithm customer treatment group that includes a subset of the plurality of customers to receive a subset of the content items in accordance with a second algorithm,
wherein at least the customers in the first algorithm customer treatment group and the customers in the second algorithm customer treatment group are selected for inclusion uniformly as a function of the customer profile information;
respectively providing, by the at least one processor, content items to the random customer treatment group, the first algorithm customer treatment group, and the second algorithm customer treatment group;
determining, by the at least one processor, metrics representing at least engagement with the respectively provided content items by each of the customers in the control customer treatment group, the random customer treatment group, the first algorithm customer treatment group, and the second algorithm customer treatment group;

selecting, by the at least one processor as a function of analyzing the metrics, at least one of the first algorithm and the second algorithm, wherein the step of selecting is made at least by:
  comparing the metrics associated with the random customer treatment group with the metrics associated with the control customer treatment group;
  comparing the metrics associated with the first algorithm customer treatment group with the metrics associated with the random customer treatment group;
  comparing the metrics associated with the second algorithm customer treatment group with the metrics associated with the first algorithm customer treatment group; and
  comparing the metrics associated with each of the random customer treatment group, the first algorithm customer treatment group, and the second algorithm customer treatment group with the metrics associated with the control customer treatment group; and respectively providing, by the at least one processor, to a plurality of the customers, content items in accordance with the selected algorithm.

2. The computer-implemented method of claim 1, wherein at least one of the customer treatment groups is further defined by:
  defining, by the at least one processor, a size of a group of customers ("bucket");
  providing, by the at least one processor, a graphical user interface;
  receiving, by the at least one processor via the graphical user interface, a lower bucket value representing a starting value and an upper bucket value representing an ending value;
  defining, by the at least one processor, as a function of the lower bucket value and the upper bucket value, a range of respective buckets; and
  allocating, by the at least one processor as a function of the defined range, customers to the respective ones of the buckets for the at least one of the customer treatment groups.

3. The computer-implemented method of claim 2, further comprising:
  validating, by the least one processor, a subset of the buckets of customers to ensure at least one of a random distribution of customers, at least one similarity of customers within each bucket, and that each bucket includes a representation of a cross-section of the plurality of customers; and
  reassigning respective customers to each of the buckets after determining the subset of the buckets fail the step of validating.

4. The computer-implemented method of claim 1, wherein the step of analyzing the metrics further includes:
  applying, by the at least one processor, at least one of machine learning and artificial intelligence to the metrics to evaluate, simultaneously, the impact of at least the first algorithm and the second algorithm on the respective customer treatment groups.

5. The computer-implemented method of claim 4, further comprising:
  revising, by the at least one processor, a subset of the respective content items by providing at least one of: new content; a new or different format of content; a new or different delivery channel; and a new or different frequency of delivery.

6. The computer-implemented method of claim 4, further comprising:
  updating, by the at least one processor as a function of the machine learning and/or the artificial intelligence, the customer profile information for future delivery of content items.

7. The computer-implemented method of claim 1, wherein the customer profile information represents at least one of previous engagement with content items and customer demographics.

8. The computer-implemented method of claim 1, wherein the first algorithm and the second algorithm have at least one common aspect, and further comprising:
  defining, by the at least one processor, for the content items, an algorithm innovation customer treatment group that includes a subset of the plurality of customers to receive content items in accordance with a third algorithm that does not have the common aspect.

9. The computer-implemented method of claim 1, wherein delivery of the content items in accordance with the first algorithm and the content items in accordance with the second algorithm is based on at least one of:
  a respective version of the content items;
  respective sequences of content delivery;
  respective times of content delivery; and
  respective frequencies of content delivery.

10. The computer-implemented method of claim 1, wherein the metrics represent at least one of:
  a rate of customer response;
  a duration of customer engagement;
  a degree of customer engagement; and
  a quality of customer engagement.

11. A computer-implemented system for delivering personalized content items to customers, the system comprising:
  at least one processor that, when executing instructions stored on non-transitory processor readable media is configured to:
    access:
      a customer database storing customer profile information respectively associated with each of a plurality of customers;
      a content repository storing content items to be provided the plurality of customers; and
      an algorithm database storing information associated with a plurality of algorithms, wherein each of the plurality of algorithms includes instructions for providing respective ones of the content items to respective subsets of the plurality of customers;
    define a plurality of mutually exclusive customer treatment groups comprising respective subsets of the plurality of customers, including:
      a control customer treatment group that includes a subset of the plurality of customers excluded from receiving the content items;
      a random customer treatment group that includes a subset of the plurality of customers randomly selected to receive a subset of the content items;
      a first algorithm customer treatment group that includes a subset of the plurality of customers to receive a subset of the content items in accordance with a first algorithm; and
      a second algorithm customer treatment group that includes a subset of the plurality of customers to receive a subset of the content items in accordance with a second algorithm,
wherein at least the customers in the first algorithm customer treatment group and the customers in the second algorithm customer treatment group are selected for inclusion uniformly as a function of the customer profile information;
respectively provide content items to the random customer treatment group, the first algorithm customer treatment group, and the second algorithm customer treatment group;
determine metrics representing at least engagement with the respectively provided content items by each of the customers in the control customer treatment group, the random customer treatment group, the first algorithm customer treatment group, and the second algorithm customer treatment group;
select, as a function of analyzing the metrics, at least one of the first algorithm and the second algorithm, wherein the step of selecting is made at least by:
comparing the metrics associated with the random customer treatment group with the metrics associated with the control customer treatment group;
comparing the metrics associated with the first algorithm customer treatment group with the metrics associated with the random customer treatment group;
comparing the metrics associated with the second algorithm customer treatment group with the metrics associated with the first algorithm customer treatment group; and
comparing the metrics associated with each of the random customer treatment group, the first algorithm customer treatment group, and the second algorithm customer treatment group with the metrics associated with the control customer treatment group; and
respectively provide, to a plurality of the customers, content items in accordance with the selected algorithm.

12. The computer-implemented system of claim 11, wherein at least one of the customer treatment groups is further defined by:
defining a size of a group of customers ("bucket");
providing a graphical user interface;
receiving, via the graphical user interface, a lower bucket value representing a starting value and an upper bucket value representing an ending value;
defining, as a function of the lower bucket value and the upper bucket value, a range of respective buckets; and
allocating, as a function of the defined range, customers to the respective ones of the buckets for the at least one of the customer treatment groups.

13. The computer-implemented system of claim 12, wherein the at least one processor, when executing instructions stored on the non-transitory processor readable media, is further configured to:
validate a subset of the buckets of customers to ensure at least one of a random distribution of customers, at least one similarity of customers within each bucket, and that each bucket includes a representation of a cross-section of the plurality of customers; and
reassign respective customers to each of the buckets after determining the subset of the buckets fail the step of validating.

14. The computer-implemented system of claim 11, wherein analyzing the metrics further includes:
applying at least one of machine learning and artificial intelligence to the metrics to evaluate, simultaneously, the impact of at least the first algorithm and the second algorithm on the respective customer treatment groups.

15. The computer-implemented system of claim 14, wherein the at least one processor, when executing instructions stored on the non-transitory processor readable media, is further configured to:
revise a subset of the respective content items by providing at least one of: new content; a new or different format of content; a new or different delivery channel; and a new or different frequency of delivery.

16. The computer-implemented system of claim 14, wherein the at least one processor, when executing instructions stored on the non-transitory processor readable media, is further configured to:
update, as a function of the machine learning and/or the artificial intelligence, of the customer profile information for future delivery of content items.

17. The computer-implemented system of claim 11, wherein of the customer profile information represents at least one of previous engagement with content items and customer demographics.

18. The computer-implemented system of claim 11, wherein the first algorithm and the second algorithm have at least one common aspect, and further wherein the at least one processor, when executing instructions stored on the non-transitory processor readable media, is further configured to:
define, for the content items, an algorithm innovation customer treatment group that includes a subset of the plurality of customers to receive content items in accordance with a third algorithm that does not have the common aspect.

19. The computer-implemented system of claim 11, wherein delivery of the content items in accordance with the first algorithm and the content items in accordance with the second algorithm is based on at least one of:
a respective version of the content items;
respective sequences of content delivery;
respective times of content delivery; and
respective frequencies of content delivery.

20. The computer-implemented system of claim 11, wherein the metrics represent at least one of:
a rate of customer response;
a duration of customer engagement;
a degree of customer engagement; and
a quality of customer engagement.

* * * * *